United States Patent
Ghavamzadeh et al.

(10) Patent No.: US 11,004,011 B2
(45) Date of Patent: May 11, 2021

(54) CONSERVATIVE LEARNING ALGORITHM FOR SAFE PERSONALIZED RECOMMENDATION

(71) Applicant: Adobe Inc., San Jose, CA (US)

(72) Inventors: Mohammad Ghavamzadeh, San Jose, CA (US); Abbas Kazerouni, Palo Alto, CA (US)

(73) Assignee: Adobe Inc., San Jose, CA (US)

( * ) Notice: Subject to any disclaimer, the term of this patent is extended or adjusted under 35 U.S.C. 154(b) by 842 days.

(21) Appl. No.: 15/424,695

(22) Filed: Feb. 3, 2017

(65) Prior Publication Data
US 2018/0225589 A1 Aug. 9, 2018

(51) Int. Cl.
*G06N 20/00* (2019.01)
*G06F 16/9535* (2019.01)
*G06Q 30/02* (2012.01)
*G06Q 40/06* (2012.01)

(52) U.S. Cl.
CPC ......... *G06N 20/00* (2019.01); *G06F 16/9535* (2019.01); *G06Q 30/0241* (2013.01); *G06Q 30/0271* (2013.01); *G06Q 40/06* (2013.01)

(58) Field of Classification Search
CPC ..................................... G06N 20/00
See application file for complete search history.

(56) References Cited

U.S. PATENT DOCUMENTS

| 10,007,927 | B2 * | 6/2018 | Koran | G06Q 30/02 |
|---|---|---|---|---|
| 2013/0080358 | A1 * | 3/2013 | Newnham | G06N 20/00 706/12 |
| 2015/0193548 | A1 * | 7/2015 | Nice | G06F 16/25 707/748 |

(Continued)

FOREIGN PATENT DOCUMENTS

EP 2546759 A1 * 1/2013 ............. G06F 17/11

OTHER PUBLICATIONS

Garcia, Javier, and Fernando Fernández. "A comprehensive survey on safe reinforcement learning." Journal of Machine Learning Research 16.1 (2015): 1437-1480. (Year: 2015).*

(Continued)

*Primary Examiner* — Michael J Huntley
*Assistant Examiner* — Ahsif A. Sheikh
(74) *Attorney, Agent, or Firm* — FIG. 1 Patents

(57) ABSTRACT

A digital medium environment includes an action processing application that performs actions including personalized recommendation. A learning algorithm operates on a sample-by-sample basis (e.g., each instance a user visits a web page) and recommends an optimistic action, such as an action found by maximizing an expected reward, or a base action, such as an action from a baseline policy with known expected reward, subject to a safety constraint. The safety constraint requires that the expected performance of playing optimistic actions is at least as good as a predetermined percentage of the known performance of playing base actions. Thus, the learning algorithm is conservative during exploratory early stages of learning, and does not play unsafe actions. Furthermore, since the learning algorithm is online and can learn with each sample, it converges quickly and is able to track time varying parameters better than learning algorithms that learn on a block basis.

20 Claims, 8 Drawing Sheets

(56) References Cited

U.S. PATENT DOCUMENTS

2016/0212484 A1* 7/2016 Kimble ............... H04N 21/2668
2018/0165603 A1* 6/2018 Van Semen ............ G06N 5/043
2018/0165745 A1* 6/2018 Zhu .................... G06Q 30/0631

OTHER PUBLICATIONS

Moldovan, Teodor Mihai, and Pieter Abbeel. "Safe exploration in Markov decision processes." arXiv preprint arXiv:1205.4810 (2012). (Year: 2012).*

* cited by examiner

CONSERVATIVE LEARNING ALGORITHM FOR SAFE PERSONALIZED RECOMMENDATION

BACKGROUND

Many problems in science and engineering can be formulated as a decision-making problem under uncertainty (e.g., personalized advertisement recommendation). Although many learning algorithms have been developed for these types of problems, most do not guarantee performance, especially at the early stages of learning. For instance, at the early stages of learning, since the learning algorithm has observed only a small amount of data, it has little knowledge about different strategies and solutions, and therefore may try (relatively) unknown strategies. As a result, during this early stage exploration, the learning algorithm may perform poorly or violate safety margins (e.g., by making an inappropriate recommendation to an online customer or performing an undesirable action). For applications where safety is required, such as online marketing, health sciences, finance, and the like, this shortcoming can prevent or cease deployment of the learning algorithm. For example, recommendation of an unsafe drug for a medical patient or dangerous investment for a financial client may cause termination of the learning algorithm.

Moreover, most learning algorithms learn in a batch mode, rather than in a sample-by-sample fashion. For instance, most learning algorithms use a fixed strategy for a certain time period, such as a week, day, or number of hours, collect data samples during the fixed time period, and then learn a new strategy that will be deployed for the next time period. Therefore, since learning occurs only at the end of a fixed observation period, convergence of the learning algorithm can be prohibitively slow. Furthermore, in time varying situations, the learning algorithm may be unable to track a time-varying optimal solution, be unable to converge to an optimal solution, or worse, diverge to an inappropriate solution (e.g., an unsafe solution that results in dangerous recommendations to a customer).

SUMMARY

This summary introduces a selection of concepts in a simplified form that are further described below in the detailed description. As such, this summary is not intended to identify essential features of the claimed subject matter, nor is it intended to be used as an aid in determining the scope of the claimed subject matter.

In one or more implementations, in a digital medium environment including an action processing application that performs recommending of actions, an improved action recommending method implemented by at least one computing device via the action processing application is described, the method comprising: obtaining a set of available actions each associated with a respective feature vector, the set of actions including a base action having a base expected reward; obtaining a confidence set of parameter vectors; selecting an optimistic action from the set of available actions that optimizes a cost function of the feature vectors and the parameter vectors by minimizing or maximizing the cost function over all of the parameter vectors in the confidence set and all of the available actions in the set of actions; calculating a safety value of a safety function of the parameter vectors, the base expected reward, and at least some of the feature vectors; determining whether the safety value is greater than a predetermined percentage of a function of the base expected reward; responsive to said determining being the safety value is greater than the predetermined percentage of the function of the base expected reward: recommending the optimistic action; and updating the confidence set by removing at least some of the parameter vectors from the confidence set; and responsive to said determining being the safety value is not greater than the predetermined percentage of the function of the base expected reward: recommending the base action.

In one or more implementations, a system implemented in a digital medium environment including a computing device having an action processing application to perform playing of actions is described, the system comprising: a processing system; and at least one computer readable medium storing instructions executable via the processing system to implement the action processing application configured to perform operations comprising: obtaining a set of available actions each associated with a respective feature vector; obtaining a base policy including a plurality of base actions each having a respective base expected reward; obtaining a confidence set of parameter vectors; selecting an optimistic action from the set of available actions that maximizes an inner product of one of the parameter vectors and one of the feature vectors over all of the parameter vectors in the confidence set and all of the available actions in the set of actions; calculating an estimate of a reward for a number of previously played actions and for playing the optimistic action; determining whether the estimate of the reward is greater than a predetermined percentage of a function of the base expected rewards; responsive to said determining being the estimate of the reward is greater than the predetermined percentage of the function of the base expected rewards: playing the optimistic action; observing a reward responsive to said playing the optimistic action; and updating the confidence set based on the optimistic action and the observed reward by removing at least some of the parameter vectors from the confidence set; and responsive to said determining being the estimate of the reward is not greater than the predetermined percentage of the function of the base expected rewards: playing one of the plurality of base actions; and maintaining the confidence set by retaining the parameter vectors in the confidence set.

In one or more implementations, in a digital medium environment including an action processing application that performs playing of actions, an improved action playing method implemented by at least one computing device via the action processing application, the method comprising: a step for obtaining a set of available actions each associated with a respective feature vector, the set of actions including a base action having a base expected reward; a step for obtaining a confidence set of parameter vectors; a step for selecting an optimistic action from the set of available actions that minimizes a regret function of the feature vectors and the parameter vectors over all of the parameter vectors in the confidence set and all of the available actions in the set of actions; a step for selecting a minimum value over all of the parameter vectors in the confidence set of a safety function of an expected reward for playing the optimistic action; a step for playing, responsive to the minimum value of the safety function being greater than a predetermined percentage of a function of the base expected reward, the optimistic action; and a step for playing, responsive to the minimum value of the safety function being not greater than the predetermined percentage of the function of the base expected reward, the base action.

The foregoing is a summary and thus contains, by necessity, simplifications, generalizations and omissions of detail;

consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
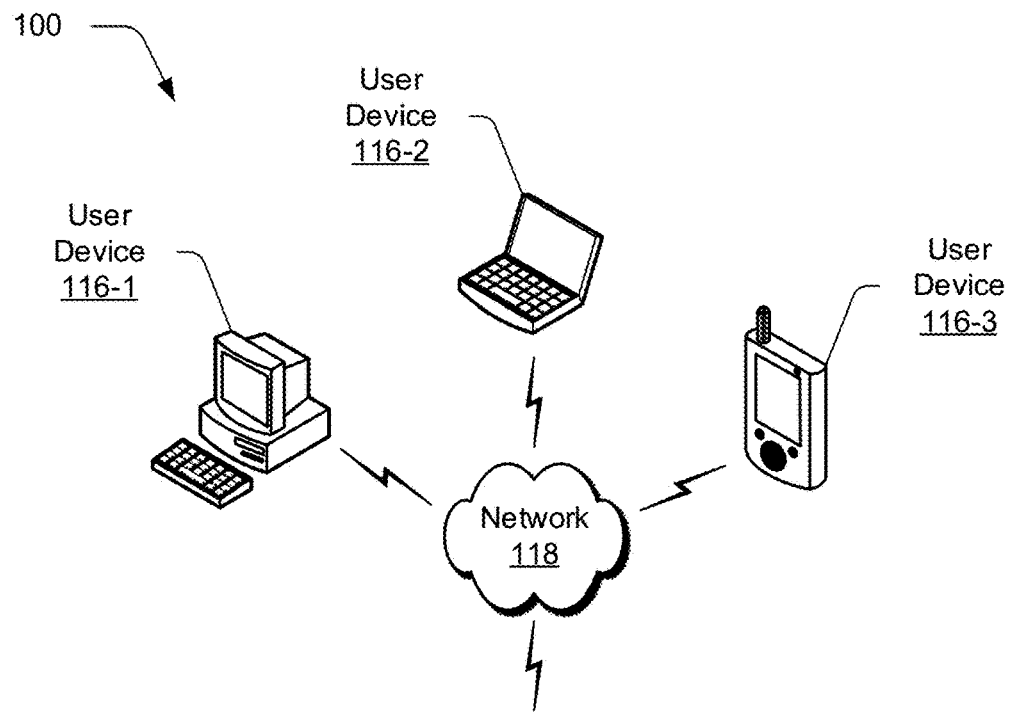
FIG. 1 is an illustration of a digital medium environment in an example implementation that is operable to employ techniques described herein.
Figure 1:
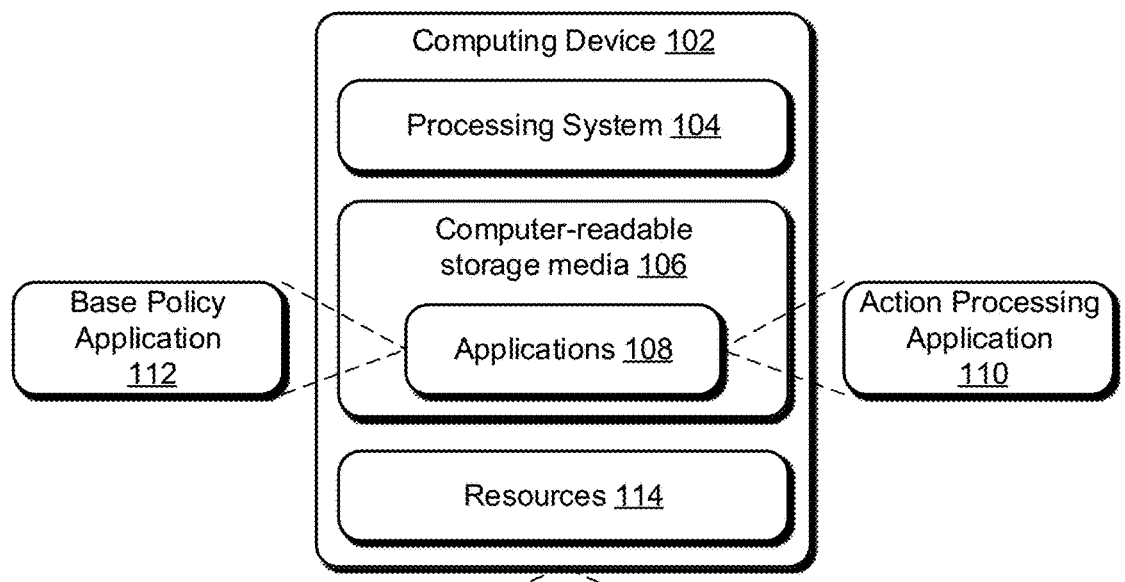
Figure 1:
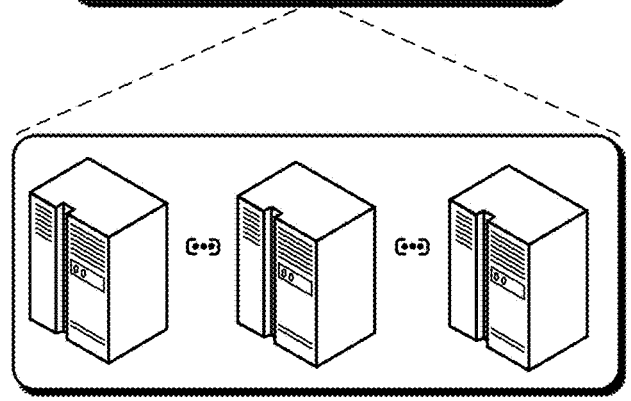

In the description below, techniques for recommending and playing actions are described in the context of personalized product recommendation (e.g., recommending a product to a user responsive to the user accessing a web page). It is to be appreciated and understood, however, that the techniques can be utilized for recommending and playing various actions other than personalized product recommendation, such as by way of example and not limitation, online marketing (e.g., recommending a movie to a video-service subscriber), proximity marketing (e.g., recommending a grocery item to a shopper in a grocery store, such as to the shopper's mobile device), health sciences (e.g., recommending a drug, procedure, or therapy for a medical patient), finance (e.g., recommending or purchasing shares of stock for a financial client), and the like without departing from the spirit and scope of the claimed subject matter.

In contrast to systems that use learning algorithms that learn in a batch mode to recommend or play an action to a user without constraining the performance of the learning algorithm, this disclosure describes techniques for updating a learning algorithm in an online fashion (e.g., on a sample-by-sample basis, such as each time a user visits a web site) to recommend or play an action by constraining the performance of the learning algorithm so that the learning algorithm is safe (e.g., does not recommend or play inappropriate actions). At each sample instance, an optimistic action is determined, such as by optimizing a cost function (e.g., minimizing a regret function or maximizing a reward function) over all choices of actions and parameter vectors in a confidence set of parameter vectors. This optimistic action is played, however, only if a safety constraint is satisfied. If the safety constraint is not satisfied, a base action (e.g., from a baseline policy that pre-exists) having a known expected reward is recommended or played. For instance, a safety constraint may require that an expected reward for playing the optimistic action is at least a predetermined percentage of the known expected reward of the base action. Moreover, the safety constraint is evaluated for a worst-case parameter vector in the confidence set (e.g., a parameter vector that minimizes the safety function over all parameter vectors in the confidence set). Therefore, the learning algorithm is conservative and does not play or recommend an inappropriate action (e.g., an unsafe action) since the worst-case expected performance of the optimistic actions played by the learning algorithm are bounded by a percentage of the performance of a base policy.

Furthermore, the confidence set is updated when an optimistic action is played, but not updated when a base action is played. Updating the confidence set comprises removing parameter vectors from the confidence set, while retaining an optimum parameter vector in the confidence set. Therefore, the learning algorithm converges quickly, since the confidence set can be narrowed to find the optimum parameter vector each time the learning algorithm plays an optimistic action, rather than waiting for a predetermined observation period to expire.

This constitutes an improvement over current approaches which primarily optimize a cost function (e.g., minimize a regret function) without constraining the performance of the learning algorithm for safety when recommending or playing an action, and update the learning algorithm slowly in a batch mode. The nature of the described embodiments to evaluate a safety function and compare a worst-case value of the safety function to a predetermined percentage of the performance of a base policy results in a learning algorithm that does not recommend or play inappropriate actions during early stages of learning while consistently satisfying safety margins, and quickly learns actions of optimum strategies, as discussed below in more detail.

In the following discussion, terms and variables are first described that are used herein. An example digital medium environment is then described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Terms and Variables

In this section, terms and variables used throughout the disclosure are described for convenience. Descriptions of these terms and variables are by way of example, and not limitation.

Action $a_i$: An available act that can be played, such as recommending a product to a user when the user visits a web page.

Available Actions Set $\mathcal{A}_t$: A set of available actions, $a_t \in \mathcal{A}_t$, that can be played at a given time, t.

Base Action $b_t$: Action according to a base or baseline policy (e.g., policy of an online retailer) having a known expected reward, and considered safe to play.

Base Expected Reward $r_{b_t}{}^t$: Known expected reward for playing a base action at time t.

Bound of Feature Vectors D: Positive bound of feature vectors, $\varnothing_a$. For instance, there exists some $D \geq 0$ such that $\|\varnothing_a\|_2 \leq D$.

Bound of Parameter Vectors B: Positive bound of parameter vectors, $\theta$. For instance, there exists some $B \geq 0$ such that $\|\theta\|_2 \leq B$.

Confidence Function $\beta_t$: Function of a desired confidence level used for comparison of distance measures associated with each parameter vector in the confidence set to update the confidence set by the learning algorithm.

Confidence Level $\delta$: Desired level of confidence, $\delta \in (0,1)$ used in updating the confidence set $\mathcal{C}_t$. A higher value of $\delta$ corresponds to a higher level of confidence.

Confidence Set $\mathcal{C}_t$: Set of parameter vectors (e.g., $\theta \in \mathcal{C}_t$) updated by the learning algorithm. The confidence set contains unknown parameter vector $\theta^*$ with high probability.

Estimate of Unknown Parameter Vector $\hat{\theta}_t$: Least squares estimate of unknown parameter vector $\theta^*$.

Expected Reward $r_a$: Expected reward for playing an action $a_t$ (e.g., when the learning algorithm recommends a product online, a user may click on a recommended link), modeled as the inner product of the feature vector of the action and unknown parameter vector for the user, $r_a = \langle \theta^*, \varnothing_a \rangle$.

Feature Vector $\varnothing_a$: A real-valued, length-d vector associated with action $a_t$ containing information describing the features of the action, such as genre, director, actors, etc. of a movie.

Length d: Dimension of parameter vectors and feature vectors, e.g., $\varnothing_a \in \mathbb{R}^d$, $\theta \in \mathbb{R}^d$, and $\theta^* \in \mathbb{R}^d$.

Noise $\eta_t$: Random noise process modeled as zero mean, conditionally $\sigma^2$-sub-Gaussian so that the variance of $\eta_t$ given $a_{1:t}, \eta_{1:t-1}$ is less than or equal to $\sigma^4$.

Number of Previous Optimistic Actions $m_{t-1}$: The number of optimistic actions played prior to current round t, which is equal to the cardinality of $\mathcal{S}_{t-1}$, or $m_{t-1} = |\mathcal{S}_{t-1}|$.

Observed Reward $Y_t$: Random observed reward for playing an action, comprising an expected reward and a noise term, $Y_t = r_{a_t} + \eta_t$.

Optimistic Action $a_t'$: Action selected by a learning algorithm that optimizes a cost function, such as maximizing an expected reward or minimizing an expected regret.

Parameter Space $\mathcal{B}$: Vector space of bounded parameter vectors, $\mathcal{B} = \{\theta \in \mathbb{R}^d : \|\theta\|_2 \leq B\}$.

Parameter Vector $\theta$: A real-valued, length-d vector associated with preferences of users.

Predetermined Percentage $\alpha$ or $(1-\alpha)$: Percentage of expected reward for playing base actions required of expected reward for playing optimistic actions in safety constraint $\Sigma_{i=1}^t r_{a_i}{}^i \geq (1-\alpha) \cdot \Sigma_{i=1}^t r_{b_i}{}^i$. Can also be expressed as a percentage of expected loss for playing optimistic actions tolerated instead of playing base actions, e.g., $\Sigma_{i=1}^t r_{b_i}{}^i - \Sigma_{i=1}^t r_{a_i}{}^i \leq \alpha \cdot \Sigma_{i=1}^t r_{b_i}{}^i$.

Safety Function $L_t$: Function evaluated in learning algorithm for comparison to a constraint value to determine whether to play an optimistic action or a base action.

Set of Samples For Previous Optimistic Actions $\mathcal{S}_{t-1}$: Set of sample times or rounds prior to time t that an optimistic action was recommended or played.

Set of Samples For Previous Base Actions $\mathcal{S}_{t-1}{}^c$: Set of sample times or rounds prior to time t that a base action was recommended or played, e.g., this set is the complement of $\mathcal{S}_{t-1}$.

Sum of Feature Vectors $z_{t-1}$: Sum of feature vectors of previously played optimistic actions, e.g., $z_{t-1} = \Sigma_{i \in \mathcal{S}_{t-1}} \varnothing_{a_i}{}^i$.

Unknown Parameter Vector $\theta^*$: Parameter vector of the user for whom an action is played, which the learning algorithm attempts to learn to play appropriate actions for the user.

Having considered example terms used herein, consider now a discussion of an example digital medium environment.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 (e.g., a server hosting a service provider) including a processing system 104 that may include one or more processing devices, one or more computer-readable storage media 106, and various applications 108 embodied on the computer-readable storage media 106 and operable via the processing system 104 to implement corresponding functionality described herein. In at least some implementations, applications 108 includes an action processing application 110. The action processing application 110 is configured to recommend an action, play an action, or recommend and play an action in accordance with techniques described herein. For instance, recommending or playing an action may comprise recommending an advertisement for a product and causing a representation of the product to be displayed to a user, recommending a movie and providing access (e.g., an executable link) to a trailer for the recommended movie, recommending purchase of a stock and providing an option to approve or decline purchase of the recommended stock, or automatically purchasing the recommended stock, and the like, as described below in more detail.

In at least some implementations, applications 108 includes a base policy application 112. The base policy application 112 is configured to recommend a base action, play a base action, or recommend and play a base action. For example, a base action may be recommended according to a base policy (e.g., a baseline policy or strategy in use by an online retailer). A base action has an expected reward for playing a base action (e.g., a likelihood a user will click on a link to a recommended product). Since the base policy exists (e.g., is already in use by the online retailer), the expected reward of a given base action is known. Base policy application 112 is also configured to provide base actions to action processing application 110.

Applications 108 may also include a web browser which is operable to access various kinds of web-based resources (e.g., lists of actions, content, and services) from servers. Applications 108 may also include an interface operable to access assets and the like from various resources, including asset stores and policy databases. Applications 108 may further include an operating system for computing device 102 and other device applications.

The computing device 102 may be configured as any suitable type of computing device. For example, the computing device may be configured as a server, a server farm, a desktop computer, a laptop computer, a workstation, a mobile device (e.g., assuming a handheld configuration such as a tablet or mobile phone), a tablet, a router, a modem, a gateway, and so forth. Thus, the computing device 102 may range from full resource devices with substantial memory and processor resources (e.g., servers and personal computers) to a low-resource device with limited memory or processing resources (e.g., mobile devices). Additionally, computing device 102 may be representative of a plurality of different devices, such as multiple servers in a server farm of a service provider, or a single computing device. Each of the servers can include some or all components of action application processing application 110, so that action application processing application 110 can be implemented on one or more servers in part or in whole. Furthermore, computing device 102 may be representative of a plurality of different devices to perform operations "over the cloud" as further described in relation to FIG. 8.

Computing device 102 is also configured to make various resources 114 available to user devices. For instance, digital medium environment 100 further depicts one or more user devices 116-1, 116-2, and 116-3 (collectively, 116), configured to communicate with computing device 102 over a network 118, such as the Internet, (e.g., to provide a "cloud-based" computing environment). Three user devices are shown for simplicity, though any number of suitable user devices can communicate with computing device 102 over network 118, such as thousands of user devices. User devices 116 each include a web browser which is operable to access various kinds of web-based resources. User devices 116 can comprise any suitable type of user device, such as by way of example and not limitation, a desktop computer, a laptop computer, a workstation, a mobile device (e.g., assuming a handheld configuration such as a tablet or mobile phone), a tablet, a camera, a gaming station, and the like. Thus, the user devices 116 may range from full resource devices with substantial memory and processor resources (e.g., personal computers and game consoles) to a low-resource device with limited memory or processing resources (e.g., mobile devices).

Network 118 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof.

Generally, computing device 102 is configured to make various resources 114 available over the network 118 to clients (e.g., user devices 116). In some scenarios, users may sign up for accounts that are employed to access corresponding resources from a provider. The provider may authenticate credentials of a user (e.g., username and password) before granting access to an account and corresponding resources 114. Resources 114 may be licensed, purchased, or may be made freely available, (e.g., without authentication, license, or account-based access). The resources 114 can include any suitable combination of services and content made available over a network by one or more providers. Some examples of services include, but are not limited to, an online commerce service (e.g., providing sales of services and products online), a video editing service, a photo editing service, a web development and management service, a collaboration service, a social networking service, a messaging service, an advertisement service, a movie distribution service, and so forth. Content may include various combinations of assets, including videos, ads, audio, multimedia streams, animations, images, web documents, web pages, applications, device applications, text documents, drawings, presentations, and the like. Resources 114 may also include an actions database operable to provide actions to action processing application 110 and base policy application 112.

Online traffic from clients (e.g., user devices 116) to computing device 102 can be split between action processing application 110 and base policy application 112. A portion of the traffic is provided to base policy application 112, and another portion of the traffic is provided to action processing application 110. For the portion of traffic provided to base policy application 112, recommendations and actions are made according to a base policy implemented by base policy application 112, and for the portion of traffic provided to action processing application 110, recommendations and actions are made according to a learning algorithm implemented by action processing application 110. Usually, a small portion of online traffic is allocated to action processing application 110. If a learning algorithm implemented by action processing application 110 recommends or plays an action to a customer that is inappropriate or violates a safety margin (such as a measure of regret must be kept below a threshold level), then there is risk that action processing application 110 will be disabled, and its portion of traffic returned to base policy application 112.

In one example, computing device 102 comprises an online retailer. A portion of traffic (e.g., web site visits) to the online retailer from user devices 116 is provided to base policy application 112, and another portion of the traffic is provided to action processing application 110. For the portion of traffic provided to base policy application 112, advertisements for products are recommended to users when they visit the online retailer according to a base policy implemented by base policy application 112, such as the online retailer's corporate policy for recommending advertisements and products to customers. For the portion of traffic provided to action processing application 110, however, advertisements for products are recommended to users when they visit the online retailer according to a learning algorithm implemented by action processing application 110, such as a learning algorithm in accordance with aspects of the disclosure as described in more detail below.

In another example, computing device 102 comprises a video service provider (e.g., providing streaming movies on a subscription basis). A portion of traffic to the video service provider from user devices 116 (e.g., accesses by a limited number of subscribers) is provided to base policy application 112, and another portion of the traffic is provided to action processing application 110. For the portion of traffic provided to base policy application 112, movie recommendations and trailers for the recommended movies are provided to users when they access the video service provider (e.g., view a menu of available movies) according to a base policy implemented by base policy application 112, such as the video service provider's corporate policy for recommending movies to customers. For the portion of traffic provided to action processing application 110, however, movies are recommended to users when they access the video service provider according to a learning algorithm implemented by action processing application 110, such as a learning algorithm in accordance with aspects of the disclosure as described in more detail below.

In one example, a portion of online traffic to action processing application 110 is time varying. For instance, more online traffic can be allocated to action processing application 110 as a learning algorithm implemented by action processing application 110 processes data over time and recommends actions with high expected rewards (e.g., users have high likelihoods of watching a recommended movie, purchasing a recommended product, or clicking on a recommended link).

Furthermore, although action processing application 110 is illustrated in FIG. 1 as comprising computing device 102, in some implementations at least some of action processing application 110 is implemented in a user device, such as in a client application implemented on user device 116-1, 116-2, or 116-3.

Having considered an example digital medium environment, consider now a discussion of a digital medium environment including an available actions component, a confidence set component, an optimistic action component, a constraint component, and an action recommending component.

Example Action Processing Application

Figure 2:
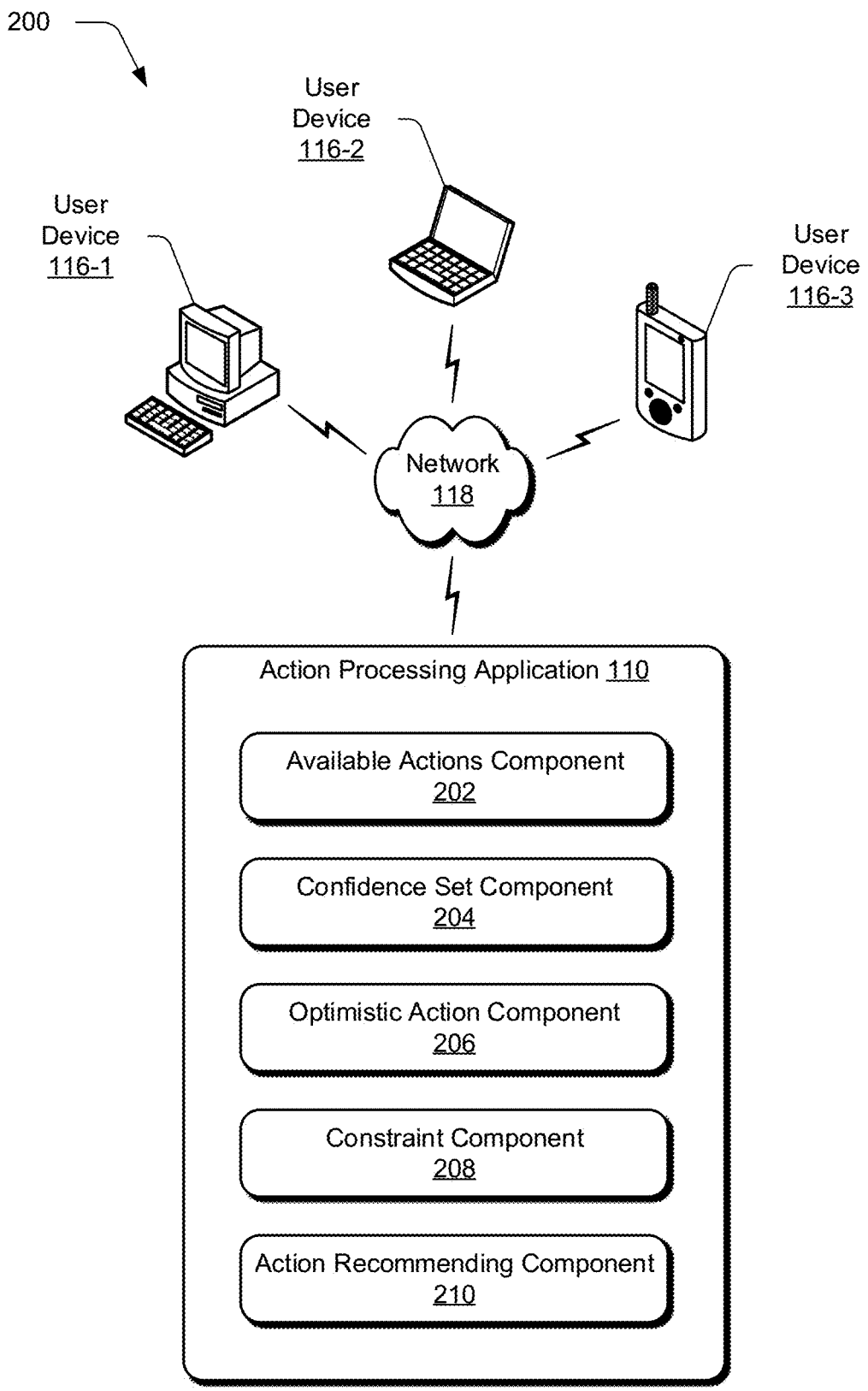
FIG. 2 illustrates a digital medium environment including an example action processing application comprising an available actions component, a confidence set component, an optimistic action component, a constraint component, and an action recommending component in accordance with one or more aspects of the disclosure.

FIG. 2 illustrates a digital medium environment 200 that includes an example action processing application 110. In this implementation, the action processing application 110 includes available actions component 202, confidence set component 204, optimistic action component 206, constraint component 208, and action recommending component 210.

This section is organized as follows: a discussion of the components of example action processing application 110 is followed by a discussion of conservative learning algorithms implementable by action processing application 110 for personalized recommendation.

Components of Example Action Processing Application

Available actions component 202 is representative of functionality that implements management of available actions that can be recommended or played at any time. Available actions component 202 can obtain available actions in any suitable way, such as from resources 114, from a computing device connected to network 118, from a computing device connected to computing device 102, combinations thereof, and the like. Available actions are represented by a set of possible actions that can be recommended or played at any time, and is denoted by set $\mathcal{A}$. For instance, in a personalized recommendation system such as for recommending movies to a video-service subscriber, the set $\mathcal{A}$ comprises a set of movies that can be recommended to the video-service subscriber, or $a \in \mathcal{A}$, for each movie a.

Each item in the set $\mathcal{A}$ has a unique set of features which distinguishes it from the other items in set $\mathcal{A}$. For instance, in the movie recommendation example, each movie has features associated with it, such as a genre of the movie, production year of the movie, director of the movie, producer of the movie, actor(s) in the movie, actress(es) in the movie, and the like. Such features of each possible action are summarized in a feature vector of each possible action, $\emptyset_a \in \mathbb{R}^d$. That is, each feature vector of an action is a real-valued vector of length d. Furthermore, feature vectors are assumed to be have bounded norms. For instance, there exists some $D \geq 0$ such that $\|\emptyset_a\|_2 \leq D$.

Features can be mapped to real-valued elements of the feature vectors in any suitable way, such as using a translation table stored in a database or resources 114. For instance, in the movie recommendation example, a feature vector of the movie African Queen staring Humphrey Bogart and Katharine Hepburn produced in 1951 may be represented as, by way of example and not limitation, $$\emptyset_{African\ Queen} = [4\ 1951\ 16\ 44\ 68\ 114]^T,$$

where $[\cdot]^T$ denotes transpose. In this example, the first entry of the feature vector has a value of 4 obtained from a translation table to denote the genre of the film as Classics. The second entry of the feature vector has a value of 1951 obtained from the translation table to denote the production year as 1951. The third entry of the feature vector has a value of 16 obtained from the translation table to denote the director of the movie is John Huston. The fourth entry of the feature vector has a value of 44 obtained from the translation table to denote the producer of the movie is Sam Spiegel. The fifth entry of the feature vector has a value of 68 obtained from the translation table to denote the lead actor of the movie is Humphrey Bogart. The sixth entry of the feature vector has a value of 114 obtained from the translation table to denote the lead actress of the movie is Katharine Hepburn. Thus, the translation table in this example contains a mapping of features of the movie African Queen to real values of the feature vector. It is to be understood that this feature vector is an example feature vector for illustrative purposes, and that a length of a feature can be any suitable length d, and is not limited to a length of 6 as used in this example, and that values of the elements of the feature vector are not limited to the example values in $\emptyset_{African\ Queen}$.

In one example, the set of available actions $\mathcal{A}$ includes a respective feature vector $\emptyset_a$ associated with each action $a \in \mathcal{A}$, and obtaining a set of available actions includes obtaining a respective feature vector for each action in the set of available actions.

Furthermore, the set of available actions $\mathcal{A}$ and feature vectors $\emptyset_a$ associated with actions a in the set of available actions can be time varying. For instance, in the movie recommendation example, a video-service provider may be able to stream a certain movie for a prescribed length of time, and therefore it can be recommended only during the prescribed time period. Thus, the set of available actions $\mathcal{A}$ and feature vectors $\emptyset_a$ are updated to reflect the availability of certain movies. Therefore, the set of available actions $\mathcal{A}$ may also be denoted as $\mathcal{A}_t$, and feature vectors $\emptyset_a$ may also be denoted as $\emptyset_a^t$ where t represents time dependence. Unless otherwise stated, however, absence of designator t does not imply that the set of available actions $\mathcal{A}$ or feature vectors $\emptyset_a$ are not time dependent (e.g., $\mathcal{A}$ and $\emptyset_a$ may still be time varying).

Confidence set component 204 is representative of functionality that implements management of a confidence set of parameter vectors. Actions from a set of available actions $\mathcal{A}$ are recommended in the context of a particular customer. For instance, movies can be recommended to a subscriber of a video service based on the subscriber's movie preferences, medication may be recommended for prescription to a patient based on the patient's medical record and drug allergies, and the like. Information associated with a particular customer is modeled as an unknown parameter vector, $\theta^* \in \mathbb{R}^d$. Confidence set component 204 constructs and updates a confidence set, $\mathcal{C}$, of parameter vectors, $\theta$, that contains the unknown parameter vector, $\theta^*$, with high probability. A learning algorithm can be used to learn the unknown parameter vector $\theta^*$.

The expected response of a customer to playing an action (e.g., recommending a movie) is modeled as a linear function of the unknown parameter vector of the customer, $\theta^*$, and the feature vector of the recommended action, $\emptyset_a$. For instance, the expected response of the customer can be modeled as an inner product of unknown parameter vector $\theta^*$ and feature vector $\emptyset_a$, $r_a = \langle \theta^*, \emptyset_a \rangle$, where $\langle m, n \rangle$ denotes inner product of vectors m and n. Upon playing an action at time t, $a_t$, a random reward is generated according to $$Y_t = r_{a_t} + \eta_t$$

where $\eta_t$ is a zero mean noise component. In one example, the zero mean noise component is assumed to be conditionally $\sigma^2$-sub-Gaussian so that the variance of $\eta_t$ given $a_{1:t}$, $\eta_{1:t-1}$ is less than or equal to $\sigma^4$. Examples of a random reward include, by way of example and not limitation, upon recommending a movie to a customer, the customer may watch the movie, add the movie to a favorites list, play a trailer of the movie, etc., and thereby generate an observable reward. Based upon a history of observed rewards $Y_t$ and actions played $a_t$, confidence set component 204 updates confidence set $C$ (described below in more detail). For instance, confidence set component 204 updates confidence set $C_t$ at each time instance t=1, 2, 3 . . . according to $$C_1 \supseteq C_2 \supseteq C_3$$

That is, at each time instance, the confidence set is updated by either maintaining the confidence set by retaining the parameter vectors in the confidence set, or by removing at least some of the parameter vectors from the confidence set. By removing parameter vectors other than the unknown parameter vector $\theta^*$ from the confidence set (described in more detail below), a confidence set is learned that includes the unknown parameter vector with high probability, enabling actions to be recommended or played that result in high rewards.

In one example, the confidence set of parameter vectors is initialized to a vector space including all vectors of length less than or equal to a length of the parameter vectors having a norm less than a predetermined bound. For instance, for some bound B≥0, a parameter space $\mathcal{B}$ is defined by all parameter vectors of length d having a norm bounded by B, e.g., $$\mathcal{B} = \{\theta \in \mathbb{R}^d : \|\theta\|_2 \leq B\}.$$

The confidence set C can be initialized to this parameter space, or $C_1$=B.

Optimistic action component 206 is representative of functionality that implements selection of an optimistic action from the set of available actions $\mathcal{A}$. Though the unknown parameter vector $\theta^*$ is generally unknown, in one example, it has been obtained (e.g., has been learned by removing parameter vectors from the confidence set until only the unknown parameter vector remains in the confidence set). Additionally or alternatively, the unknown parameter vector $\theta^*$ can be obtained by other methods, such as a user filling in a user profile including preferences, likes, and dislikes, when subscribing to a service. In this example where $\theta^*$ is known, optimistic action component 206 selects an optimistic action as the action in the set of available actions that results in a maximum expected reward for recommending or playing the optimistic action, or $$a'_t = \underset{a \in \mathcal{A}_t}{\operatorname{argmax}} \langle \theta^*, \emptyset^t_a \rangle.$$

When unknown parameter vector $\theta^*$ has not been learned (e.g., is not known), optimistic action component 206 selects an optimistic action from the set of available actions as the action that optimizes a cost function of the feature vectors and the parameter vectors. Optimizing the cost function can comprise minimizing or maximizing the cost function over all of the parameter vectors in the confidence set and all of the available actions in the set of actions. Any suitable cost function can be used, such as by way of example and not limitation, a cost function measuring reward for recommending or playing an action (e.g., how many times a user clicks on a link responsive to suggesting the link), a cost function measuring regret for recommending or playing an action (e.g., comparing a difference between an expected reward for recommending or playing an action and a reward for recommending or playing another action, such as a base action).

In one example, the cost function is an expected reward for recommending or playing an action, and the cost function is maximized. For instance, optimistic action component 206 selects an optimistic action from the set of available actions that maximizes an inner product of one of the parameter vectors and one of the feature vectors over all of the parameter vectors in the confidence set and all of the available actions in the set of actions, e.g., $$a'_t = \underset{a \in \mathcal{A}_t}{\operatorname{argmax}} \underset{\theta \in C_t}{\max} \langle \theta, \emptyset_a \rangle.$$

In another example, the cost function is a measure of regret, pseudo-regret, or loss for recommending or playing an action, and the cost function is minimized. For instance, optimistic action component 206 selects an optimistic action from the set of available actions that minimizes a regret function of the feature vectors and the parameter vectors over all of the parameter vectors in the confidence set and all of the available actions in the set of actions, e.g., $$a'_t = \underset{a \in \mathcal{A}_t}{\operatorname{argmin}} \underset{\theta \in C_t}{\max} (J - \langle \theta, \emptyset_a \rangle).$$

Here, J can be an suitable measure, such as an estimate of an expected reward for an action having a maximum expected reward among all actions, a suitably large number (e.g., a number larger than $\langle \theta, \emptyset_a \rangle$ over all choices of a and $\theta$), an expected reward of a base action corresponding to a base policy, and the like.

Constraint component 208 is representative of functionality that implements comparison of a value of a safety function to a constraint. The safety function and constraint are used by constraint component 208 to determine whether performance of optimistic actions selected by optimistic action component 206 satisfy a safety constraint before being recommended or played. Thus, an optimistic action that may be unsafe or inappropriate (e.g., recommending a violent R-rated movie to a child) can be detected and avoided.

Constraint component 208 constrains the difference between expected rewards of recommending or playing optimistic actions selected by optimistic action component 206 with the expected rewards of recommending or playing base actions, such as according to a base policy. For example, the difference in expected rewards is constrained to be less than a predetermined percentage of a function of the expected reward of the base action. For instance, for base action $b_t \in \mathcal{A}_t$ having a known expected reward $r_{b_t}^t = \langle \theta^*, \emptyset_{b_t}^t \rangle$, the constraint at each time t can be expressed as $$\sum_{i=1}^{t} r_{b_i}^i - \sum_{i=1}^{t} r_{a_i}^i \leq \alpha \cdot \sum_{i=1}^{t} r_{b_i}^i$$

This constraint can be re-written as $$\sum_{i=1}^{t} r_{a_i}^j \geq (1-\alpha) \cdot \sum_{i=1}^{t} r_{b_i}^j.$$

Thus, the constraint can also be interpreted as requiring the expected reward of recommending optimistic actions to be greater than a predetermined percentage of a function of the base expected reward, such as a sum of the base expected rewards. The parameter α determines a level of conservatism required. Small values of a indicate that only small losses relative to a base policy are tolerated, while large values of a indicate a willingness to take risk so that more optimistic actions can be explored. In one example, the predetermined percentage varies over time. For instance, as confidence grows in the optimistic action selected by optimistic action component 206, parameter α can be increased so that the predetermined percentage is lowered.

Constraint component 208 verifies the constraint is satisfied by evaluating a safety function for the worst choice of parameter vector θ∈C (e.g., the choice of parameter vector resulting in a minimum value of the safety function). The safety function can be an estimate of reward based on a number of previously played actions and for playing a current optimistic action selected by optimistic action component 206. Let $S_{t-1}$ be the set of samples prior to time t that an optimistic action from optimistic action component 206 has been recommended or played. (As will be discussed later, for the complement of this set, $S_{t-1}^c$, a base action can be played instead of an optimistic action.) Constraint component 208 determines whether a safety value of a safety function is greater than a predetermined percentage of a function of the base expected reward (e.g., expected reward of a base action). The safety value corresponds to one of the parameter vectors in the confidence set that minimizes the safety function over all of the parameter vectors in the confidence set. In one example, constraint component 208 determines whether $$\min_{\theta \in C_t}\left[\sum_{i \in S_{t-1}^c} r_{b_i}^j + \langle \theta, z_{t-1}\rangle + \langle \theta, \emptyset_{a_t'}^t\rangle\right] \geq (1-\alpha) \cdot \sum_{i=1}^{t} r_{b_i}^j$$

is satisfied, where $z_{t-1} = \Sigma_{i \in S_{t-1}} \emptyset_{a_i}^i$ is a sum of feature vectors of previously played optimistic actions. The first term of the safety function, $\Sigma_{i \in S_{t-1}^c} r_{b_i}^i$, corresponds to those samples prior to time t for which a base action has been recommended or played and is a measure of reward for recommending or playing the base action(s). The second term of the safety function, $\langle \theta, z_{t-1}\rangle$, corresponds to those samples prior to time t for which an optimistic action selected in optimistic action component 206 was recommended or played and is a measure of reward for recommending or playing the previous optimistic actions. The third term in the safety function, $\langle \theta, \emptyset_{a_t'}^t\rangle$, corresponds to a current optimistic action at time t selected in optimistic action component 206 and is and is a measure of reward for recommending or playing the current optimistic action.

Constraint component 208 determines if the safety function satisfies the safety constraint, and generates a binary indicator. For example, a TRUE value of the binary indicator denotes that the safety constraint is satisfied (e.g., the safety function evaluated at the worst case parameter vector is greater than a predetermined percentage of a function of the base expected reward). A FALSE value of the binary indicator denotes that the safety constraint is not satisfied (e.g., the safety function evaluated at the worst case parameter vector is not greater than a predetermined percentage of a function of the base expected reward). The binary indicator is provided to action recommending component 210.

Action recommending component 210 is representative of functionality that implements recommending or playing of an action. Action recommending component 210 recommends either a base action (e.g., from a base policy) or a current optimistic action selected in optimistic action component 206, based on the binary indicator provided from constraint component 208. If constraint component 208 determines that the performance constraint is satisfied, and a TRUE binary indicator is provided, action recommending component 210 recommends an optimistic action selected in optimistic action component 206. Otherwise, if constraint component 208 determines that the performance constraint is not satisfied, and a FALSE binary indicator is provided, action recommending component 210 recommends a base action, such as a base action corresponding to a base policy provided by base policy application 112. In implementations, recommending an action comprises playing the action, such as causing an advertisement to be displayed to a customer.

By recommending or playing an optimistic action only when a safety constraint is satisfied, and otherwise recommending or playing a base action, safety is guaranteed and playing inappropriate actions is avoided. This constitutes an improvement over current approaches which primarily optimize a cost function (e.g., minimize a regret function) without constraining the performance of the learning algorithm for safety when recommending or playing an action. The nature of the described embodiments to evaluate a safety function and compare a worst-case value of the safety function to a predetermined percentage of the performance of a base policy results in a learning algorithm that does not recommend or play inappropriate actions during early stages of learning while consistently satisfying safety margins. At the same time, the learning algorithm learns quickly as it updates a confidence set of parameter vectors each time instance an optimistic action is recommended or played, as described below in more detail.

Having considered a discussion of components of action processing application 110, consider now a discussion of a conservative algorithm for recommending and playing actions that can be implemented using the components of action processing application 110.

Conservative Linear Upper Confidence Bound (CLUCB) Algorithm

Action processing application 110 can be configured to implement conservative learning algorithms for recommending and playing actions that satisfy safety margins and do not make inappropriate recommendations.

Since the expected reward for playing a base action suggested by a baseline policy at each round t (e.g., $r_{b_t}^r$) is known a priori, playing a base action does not provide any new information about the unknown parameter vector θ*. Thus, a conservative linear upper confidence bound (CLUCB) algorithm described herein does not update the confidence set for a predetermined number of samples while a base action is played or recommended. After the predetermined number of samples, CLUCB algorithm starts exploring actions other than those suggested by the base policy and updates the confidence set when optimistic actions are recommended or played. A CLUCB algorithm is a learning algorithm that attempts to learn the unknown parameter vector θ*.

A CLUCB algorithm is summarized by the pseudo code in Table 1 below for time t=1, 2, 3 . . . corresponding to time samples after the predetermined number of samples while a base action is played or recommended.

TABLE 1

CLUCB Algorithm Pseudo Code

Input: α, $\mathcal{A}_t$, $\mathcal{B}$
Initialize: $\mathcal{S}_0$ = Empty, $z_0 = 0 \in \mathbb{R}^d$, $\mathcal{C}_1 = \mathcal{B}$
for t = 1, 2, 3 . . . do
  Find optimistic action,
    $a'_t = \underset{a \in \mathcal{A}_t}{\operatorname{argmax}}\, \underset{\theta \in \mathcal{C}_t}{\max} \langle \theta, \varnothing_a \rangle$
  Evaluate safety function,
    $L_t = \underset{\theta \in \mathcal{C}_t}{\min}\, [\langle \theta, z_{t-1} + \varnothing^t_{a'_t} \rangle] + \sum_{i \in \mathcal{S}_{t-1}^c} r_{b_i}^i$
  if $L_t \geq (1 - \alpha) \cdot \sum_{i=1}^{t} r_{b_i}^i$ then
    Play $a_t = a'_t$ and observe $Y_t = \langle \theta^*, \varnothing_a \rangle + \eta_t$
    Set $z_t = z_{t-1} + \varnothing_{a'_t}^t$, $\mathcal{S}_t = \mathcal{S}_{t-1} \cup t$, and $\mathcal{S}_t^c = \mathcal{S}_{t-1}^c$
    Update confidence set $\mathcal{C}_{t+1} = f(\mathcal{C}_t, a_t, Y_t)$ (see below)
  else
    Play $a_t = b_t$ and observe $Y_t = \langle \theta^*, \varnothing_a \rangle + \eta_t$
    Set $z_t = z_{t-1}$, $\mathcal{S}_t = \mathcal{S}_{t-1}$, and $\mathcal{S}_t^c = \mathcal{S}_{t-1}^c \cup t$
    Maintain confidence set $\mathcal{C}_{t+1} = \mathcal{C}_t$
  end if
end for In the CLUCB algorithm summarized by the pseudo code in Table 1, parameter α, current available actions set $\mathcal{A}_t$, and parameter space $\mathcal{B}$ are input to the algorithm Variables are initialized by setting $\mathcal{S}_0$, the set of samples prior to time t=1 that an optimistic action has been recommended or played, to an empty set (e.g., a null set). Vector $z_t$, the sum of feature vectors of previously played optimistic actions, is initialized by setting $z_0$ to a length-d all-zero vector for t=1. The confidence set of parameter vectors is initialized to a parameter space comprising parameter vectors having bounded norms by setting $\mathcal{C}_1 = \mathcal{B}$ for use at the first round (e.g., sample time t=1).

The CLUCB algorithm operates on a sample-by-sample basis (e.g., for each t=1, 2, 3 . . . ), rather than on a block basis. For instance, each sample index t may correspond to each time a user visits a web page, each time a user accesses a menu of available movies from a video-service provider, each time a customer visits a store with a remote device (e.g., a mobile phone), and the like. Responsive to an event triggering a new sample index, such as a user visiting a web page, the CLUCB algorithm may be executed so that an action is played (e.g., recommending a product to the user), and a random reward is observed (e.g., whether the user clicks on a link for the recommended product or buys the recommended product). Each sample instance where an action is played and reward observed may thus be referred to as a round.

For each sample instance, the CLUCB algorithm in Table 1 selects an optimistic action $a'_t$ from the current available actions set $\mathcal{A}_t$. For instance, the CLUCB algorithm selects an optimistic action by optimizing (maximizing or minimizing) a cost function. In the example in Table 1, the CLUCB algorithm selects an optimistic action as the action from the current available actions set $\mathcal{A}_t$ that maximizes the inner product of feature vectors of actions in current available actions set $\mathcal{A}_t$ with parameter vectors in the current confidence set $\mathcal{C}_t$ over all choices of available actions in $\mathcal{A}_t$ and parameter vectors in $\mathcal{C}_t$. For example, for all combinations of $(a_t, \theta) \in \mathcal{A}_t \times \mathcal{C}_t$, where x denotes Cartesian product, the optimistic action is selected as the action that maximizes $\langle \theta, \varnothing_{a_t} \rangle$.

The CLUCB algorithm then evaluates a safety function, $L_t$. A safety value of the safety function is determined by evaluating the safety function for all parameter vectors in the current confidence set $\mathcal{C}_t$ and setting the safety value to the minimum value of the safety function (e.g., the safety value corresponds to one of the parameter vectors in the confidence set that minimizes the safety function over all of the parameter vectors in the confidence set). In the example in Table 1, safety function $L_t$ comprises two components. A first component, $\langle \theta, z_{t-1} + \varnothing_{a'_t}^t \rangle$, comprises an inner product of a parameter vector in the confidence set (θ) with a sum of the feature vector of the selected optimistic action ($\varnothing_{a'_t}^t$) and a vector comprising the sum of feature vectors of previously played optimistic actions ($z_{t-1}$). A second component, $\sum_{i \in \mathcal{S}_{t-1}^c} r_{b_i}^i$, comprises a sum of expected rewards of previously played base actions ($r_{b_i}^i$). Because the base expected rewards are known, the second component does not depend on parameter vector θ, so that the minimization over parameter vector θ can be efficiently done using only the first term. However, the safety value of the safety function includes the minimum of the first term over all parameter vectors in the confidence set, summed with the second term.

The CLUCB algorithm then compares the safety value to a constraint value to determine if a safety constraint is satisfied. The constraint value comprises a predetermined percentage of a function of the base expected rewards. If the safety function is greater than or equal to the constraint value, then the safety constraint is satisfied (e.g., TRUE). Otherwise, the safety constraint is not satisfied (e.g., FALSE). In the example in Table 1, the constraint value comprises a predetermined percentage of a sum of base expected rewards, $(1-\alpha) \cdot \sum_{i=1}^{t} r_{b_i}^i$. Therefore, the safety constraint is satisfied only when the expected performance of playing optimistic actions is at least as good as a predetermined percentage of the performance of playing base actions, such as from a baseline policy.

If the safety constraint is not satisfied (e.g., FALSE), then the CLUCB algorithm plays a base action $b_t$, rather than the optimistic action $a'_t$. For instance, by failing the safety constraint, the optimistic action is determined to be unsafe, and instead a known safe action is played according to a base policy. Furthermore, because the base action has a known expected reward, no new information is learned from playing the base action. Therefore, the confidence set is maintained by retaining the parameter vectors in the confidence set, or $\mathcal{C}_{t+1} = \mathcal{C}_t$.

However, if the safety constraint is satisfied (e.g., TRUE), then the CLUCB algorithm plays the optimistic action $a'_t$. In this case, new information can be learned by playing the optimistic action, so that the confidence set can be updated. The updated confidence set is a function of the current confidence set, the optimistic action, and a random reward observed responsive to playing the optimistic action, or $\mathcal{C}_{t+1} = f(\mathcal{C}_t, a_t, Y_e)$.

More specifically, to update the confidence set, at each round an optimistic action is played instead of a base action, an estimate of the unknown parameter vector θ* is determined. The estimate of the unknown parameter vector can be found in any suitable fashion. In one example, a least squares estimate is found based on observed data for rounds where an optimistic action was previously played. A least squares estimate can be advantageous compared to an estimate based on higher-order statistics, since the least squares cost function is convex, and therefore provides a unique answer. Furthermore, second-order statistics generally converge more quickly than higher-order statistics and thus require fewer data samples to achieve accurate estimates. A least squares estimate of unknown parameter vector θ* is denoted by $\hat{\theta}_t$ and can be found according to $$\hat{\theta}_t = \underset{\theta \in \mathcal{B}}{\operatorname{argmin}} \sum_{i \in S_{t-1}} (Y_i - \langle \theta, \phi_{a_i}^i \rangle)^2.$$

This least squares estimate is found my minimizing, over all parameter vectors (θ) in a parameter space ($\mathcal{B}$) comprising parameter vectors having a bounded norm, the square of the difference between observed rewards ($Y_i$) and expected rewards. Here, the expected rewards comprise an inner product of a parameter vector in the parameter space and feature vectors of previously played optimistic actions. This least squares estimate is one example of a least squares estimate and can be modified in any suitable way. For instance, terms in the sum may be weighted relative to one another, so that terms for more recently played optimistic actions are more heavily weighted than terms for older played optimistic actions.

The confidence set is updated by retaining only the parameter vectors in the confidence set having an expected reward for previously played optimistic actions sufficiently close to the expected reward of the least squares estimate for the previously played optimistic actions. Being sufficiently close can be determined by calculating a distance measure for each parameter vector in the confidence set and comparing the distance measure for each parameter vector to a value of a confidence function of a desired confidence level. If the distance measure for a parameter vector is greater than the value of the confidence function of the desired confidence level, then the parameter vector is removed from the confidence set.

In one example, the distance measure is a least squares distance measure, and the confidence set is updated at time t according to $$C_t = \left\{ \theta \in C_{t-1} : \sqrt{\sum_{i \in S_{t-1}} (\langle \theta, \phi_{a_i}^i \rangle - \langle \hat{\theta}_t, \phi_{a_i}^i \rangle)^2} \leq \beta_t \right\}.$$

In this equation, the new confidence set comprises those parameter vectors from the previous confidence set such that the least squares distance measure associated with those parameter vectors is less than or equal to a value of confidence function $\beta_t$. The expected reward of parameter vectors in the confidence set for previously played optimistic actions is determined by an inner product of the parameter vector with the feature vectors of the previously played optimistic actions, $\langle \theta, \emptyset_{a_i}^i \rangle$. The expected reward of the least squares estimate for the previously played optimistic actions is determined by an inner product of the least squares estimate with the feature vectors of the previously played optimistic actions, $\langle \hat{\theta}_t, \emptyset_{a_i}^i \rangle$. A least squares distance measure takes the square root of the sum of the squares of the differences between the expected rewards of the parameter vectors and the expected rewards of the least squares estimate. The distance measure for each parameter vector is compared to a value of confidence function $\beta_t$ to determine if the parameter vector is removed from the confidence set or maintained in the confidence set. If the distance measure is greater than the value of the confidence function $\beta_t$, the parameter vector is removed from the confidence set. Else, the parameter vector is maintained in the confidence set. Thus, confidence set $C_t$ at each time instance t=1, 2, 3 . . . is updated so that $C_1 \supseteq C_2 \supseteq C_3 \ldots$.

The confidence function $\beta_t$ is a function of a desired confidence level, $\delta \in (0,1)$, and the number of optimistic actions played prior to current round t, denoted as $m_{t-1}=|S_{t-1}|$ (e.g., the number of optimistic actions played prior to the current round is equal to the cardinality of $S_{t-1}$). A higher value of δ denotes a higher confidence level. The confidence function $\beta_t$ can be any suitable function of the desired confidence level. In one example, the confidence function $\beta_t$ is $$\beta_t = \sqrt{16d\sigma^2 \log\left(\frac{2(m_{t-1}+1)}{\delta}\right)} + \frac{2}{m_{t-1}+1} \cdot \left(16BD + \sqrt{8\sigma^2 \log\left(\frac{4(m_{t-1}+1)^2}{\delta}\right)}\right).$$

By updating the confidence set as thus described, the inventors have determined that the confidence set $C_t$ contains the unknown parameter vector θ* with arbitrarily high probability, based on the desired confidence level, δ. For example, the inventors have determined that the confidence set $C_t$ contains the unknown parameter vector θ* with probability $$\mathbb{P}[\theta^* \in C_t, \forall t \in \mathbb{N}] \geq 1 - 2\delta$$

where $\mathbb{P}[\cdot]$ denotes probability and $\mathbb{N}$ denotes the set of natural numbers.

Therefore, the CLUCB algorithm represented by the pseudo code in Table 1 constitutes an improvement over current approaches that are block based and not conservative in their recommendations and actions. The CLUCB algorithm plays an optimistic action only when a safety constraint is satisfied, and otherwise plays a known, safe action from a base policy. Since the safety constraint is satisfied only when the expected performance of playing optimistic actions is at least as good as a predetermined percentage of the performance of playing base actions, the CLUCB is conservative and does not play unsafe actions, such as recommending an inappropriate movie to a minor. Furthermore, since the CLUCB algorithm learns on a sample-by-sample basis (e.g., the confidence set is updated with each optimistic action played), the CLUCB algorithm converges more quickly than batch-based learning algorithms and better tracks time varying conditions.

Having considered a discussion of components of action processing application 110 and algorithms implementable by action processing application 110, consider now example methods in accordance with one or more embodiments.

Example Procedures

Figure 3:
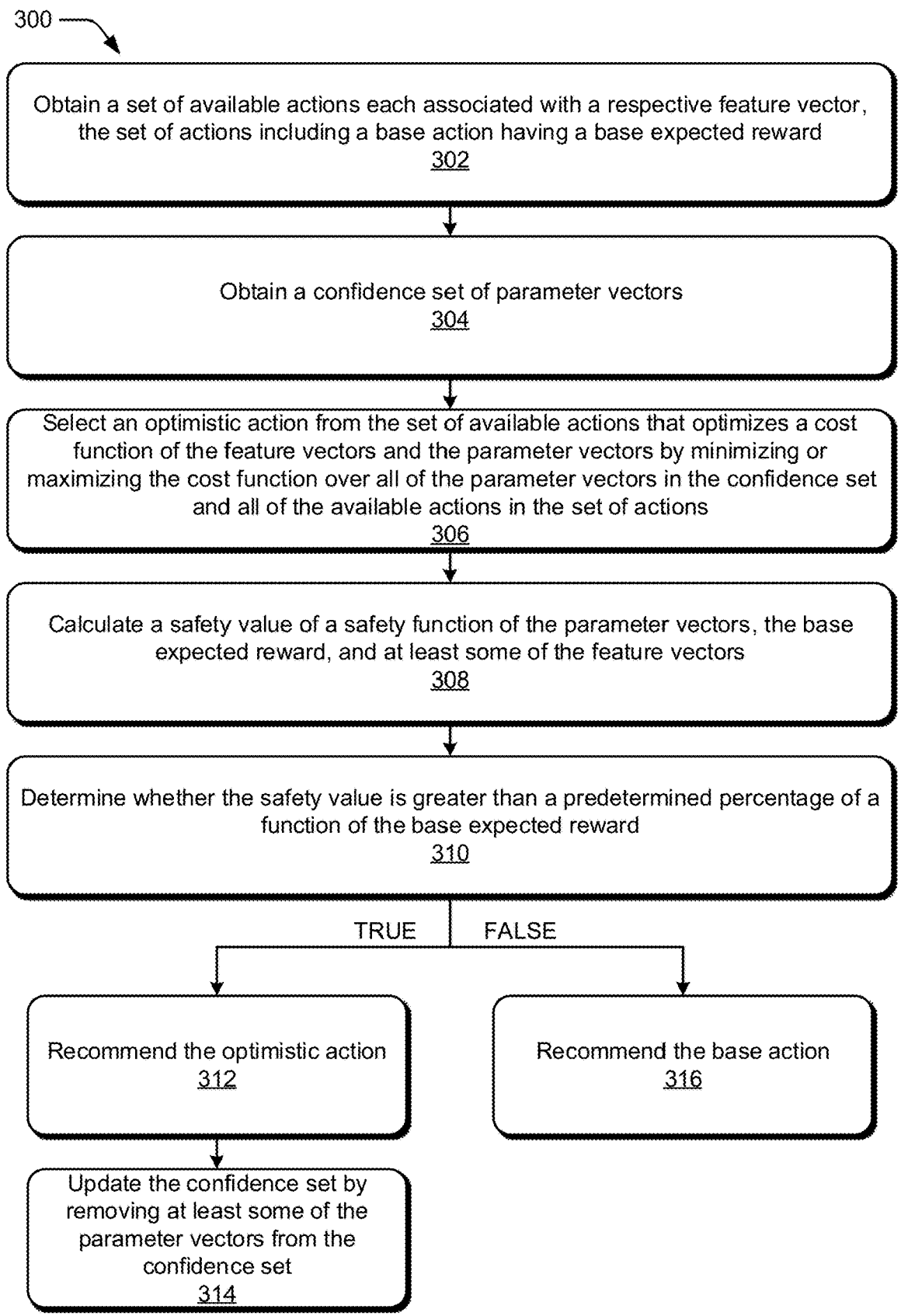
FIG. 3 is a flow diagram depicting an example procedure in accordance with one or more aspects of the disclosure.

FIG. 3 illustrates an example procedure 300 for recommending and playing actions in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an action processing application 110, such as that described above. An action processing application implementing procedure 300 may be an independent application that has been installed on computing device 102, a service hosted by a service provider that is accessible by computing device 102, or a plug-in module to computing device 102. Furthermore, an action processing application implementing procedure 300 may be an application implemented at least partly on a client application of a client device, such as user device 116-1, 116-2, and 116-3.

Referring to FIG. 3, a set of available actions each associated with a respective feature vector is obtained (block 302). The set of actions includes a base action having a base expected reward. The base action can correspond to a baseline policy, such as a recommendation policy of a service provider. The set of actions can be time varying, and the base action at any time can be the same as or different than the base action at another time. Available actions can correspond to available products to recommend to a shopper, available movies to recommend to a video-service subscriber, and the like.

A confidence set of parameter vectors is obtained (block 304). In one example, the confidence set is initialized to a vector space including all vectors of length equal to a length of the parameter vectors having a norm less than a predetermined positive bound. For instance, an $l_2$-norm of all vectors in the parameter space are less than or equal to some positive bound. In one example, the confidence set is an updated confidence set having been previously updated by removing parameter vectors from the confidence set responsive to observing a random reward generated from previously playing an optimistic action (e.g., the confidence set can be obtained from a previous iteration of a learning algorithm).

An optimistic action from the set of available actions is selected that optimizes a cost function of the feature vectors and the parameter vectors by minimizing or maximizing the cost function over all of the parameter vectors in the confidence set and all of the available actions in the set of actions (block 306). In one example, the cost function comprises an inner product of one of the parameter vectors and one of the feature vectors. The cost function can measure expected reward, in which case the cost function can be maximized. Alternatively, the cost function can measure regret (or pseudo regret or loss), in which case the cost function can be maximized.

A safety value of a safety function of the parameter vectors, the base expected reward, and at least some of the feature vectors is calculated (block 308). In one example, the safety value corresponds to one of the parameter vectors in the confidence set that minimizes the safety function over all of the parameter vectors in the confidence set (e.g., by evaluating the safety function for all parameter vectors in the current confidence set $C_t$ and setting the safety value to the minimum value of the safety function). The safety function may comprise a sum of expected base rewards (e.g., known rewards for base actions of a baseline policy) for previous rounds where an optimistic action was not played, a sum of estimated rewards for previous rounds where an optimistic action was played, and an expected reward for playing a current optimistic action (e.g., the optimistic action selected at block 306).

It is determined whether the safety value is greater than a predetermined percentage of a function of the base expected reward (block 310). The function of the base expected reward can be any suitable function, such as a sum of expected base rewards for a number of previously played rounds (e.g., sum of base expected rewards of previously played rounds when only a base policy is used and no optimistic action is played), a number of previously played rounds times a base expected reward, and the like. Furthermore, the predetermined percentage can vary over time.

Responsive to the determining at block 310 being the safety value is greater than the predetermined percentage of the function of the base expected reward (e.g., the determination is TRUE), the optimistic action is recommended (block 312), and the confidence set is updated by removing at least some of the parameter vectors from the confidence set (block 314). Recommending the optimistic action can include recommending an advertisement, movie, consumer product, medical treatment, financial investment, and the like. Updating the confidence set can comprise calculating a distance measure for each parameter vector in the confidence set. In one example, the distance measure is a least squares measure, and the removed parameter vectors from the confidence set have a respective distance measure greater than a value of a function of a desired confidence level and a number of previously recommended optimistic actions. The least squares distance measure can measure a distance between expected rewards of parameter vectors in the confidence set for previously played optimistic actions, and an expected reward of an estimate of an unknown parameter for previously played optimistic actions. In one example, the estimate of the unknown parameter is a least squares estimate.

Responsive to the determining at block 310 being the safety value is not greater than the predetermined percentage of the function of the base expected reward (e.g., the determination is FALSE), the base action is recommended (block 316).

In one example, obtaining the confidence set, selecting an optimistic action, calculating a safety value, determining whether the safety value satisfies a safety constraint (e.g., is greater than a predetermined percentage of a function of a base expected reward), and recommending an optimistic action or recommending a base action are performed responsive to a user performing an action, such as accessing a web page, moving into proximity of a kiosk at a store that communicates with a mobile device, accessing a menu of available movies provided by a video provider, and the like. Furthermore, obtaining the confidence set, selecting an optimistic action, calculating a safety value, determining whether the safety value satisfies a safety constraint (e.g., is greater than a predetermined percentage of a function of a base expected reward), and recommending an optimistic action or recommending a base action can be performed on a sample-by-sample basis (e.g., online).

Figure 4:
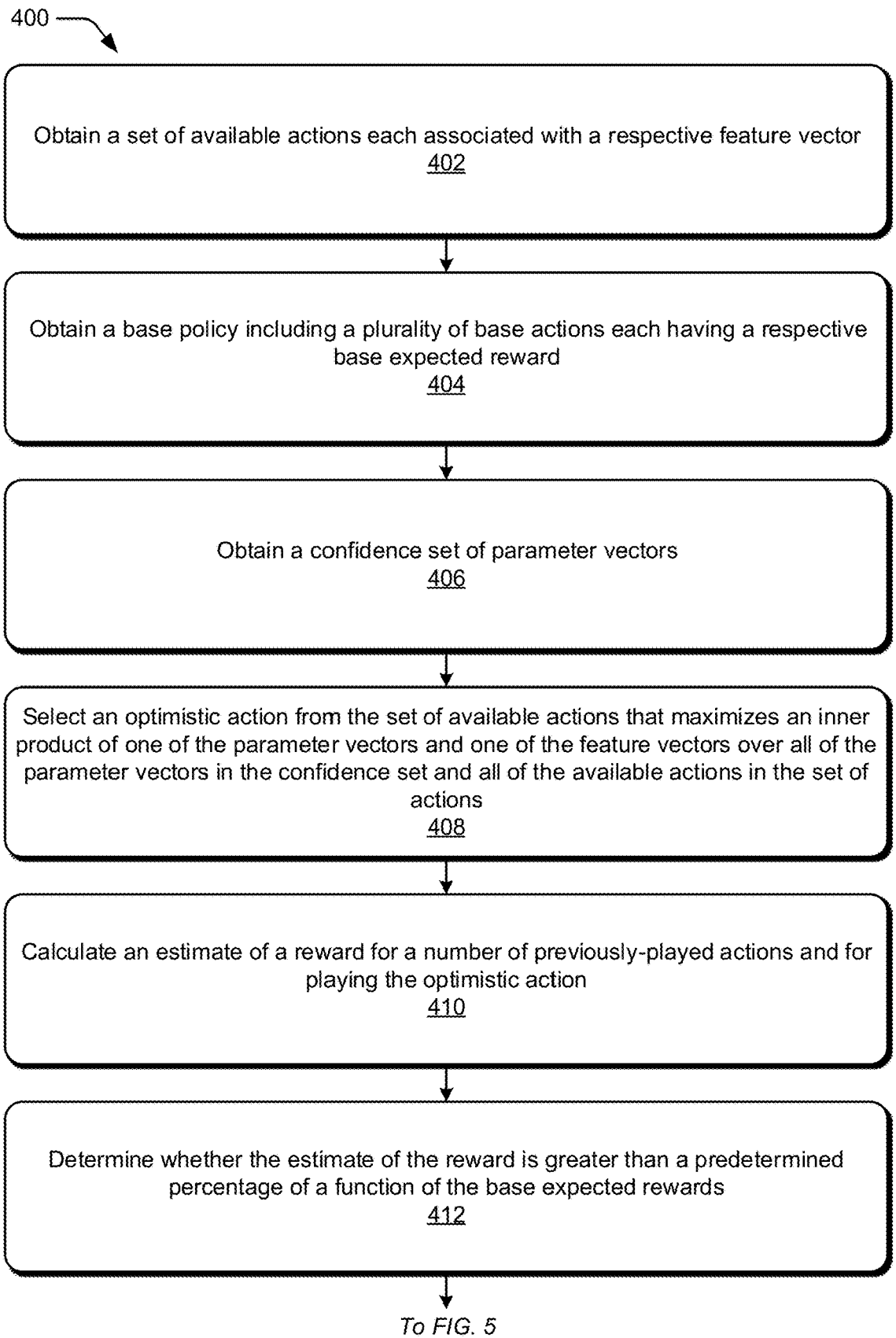
FIG. 4 and FIG. 5 are a flow diagram depicting an example procedure in accordance with one or more aspects of the disclosure.
Figure 5:
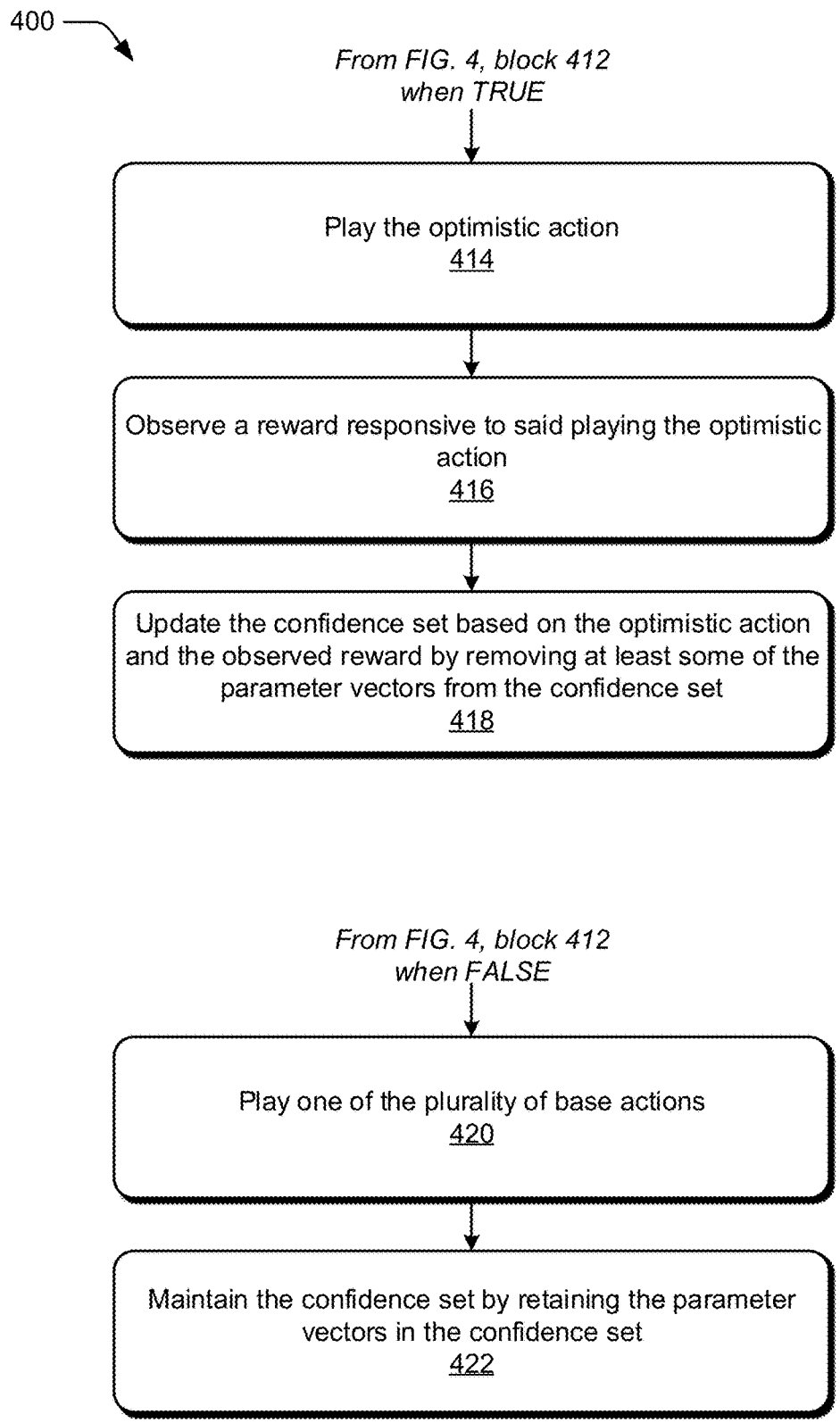

FIG. 4 and FIG. 5 illustrate an example procedure 400 for recommending and playing actions in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an action processing application 110, such as that described above. An action processing application implementing procedure 400 may be an independent application that has been installed on computing device 102, a service hosted by a service provider that is accessible by computing device 102, or a plug-in module to computing device 102. Furthermore, an action processing application implementing procedure 400 may be an application implemented at least partly on a client application of a client device, such as user device 116-1, 116-2, and 116-3.

A set of available actions each associated with a respective feature vector is obtained (block 402). The set of available actions can be time varying. Furthermore, the feature vectors can be time varying. Available actions can correspond to available products to recommend to a shopper, available movies to recommend to a video-service subscriber, and the like.

A base policy including a plurality of base actions each having a respective base expected reward is obtained (block 404). For instance, the base policy can be a baseline policy of a service provider, online retailer, department store, hospital, financial advisor, and the like.

A confidence set of parameter vectors is obtained (block 406). For instance, the confidence set can be an initialized confidence set, such as to a bounded parameter space, or a confidence set that has been updated at a previous iteration of a learning algorithm responsive to a previously-played action being an optimistic action rather than a base action.

An optimistic action from the set of available actions is selected that maximizes an inner product of one of the parameter vectors and one of the feature vectors over all of the parameter vectors in the confidence set and all of the available actions in the set of actions (block 408). The inner product is a measure of expected reward.

An estimate of a reward for a number of previously-played actions and for playing the optimistic action is calculated (block 410). For instance, the previously-played actions can comprise previously-played optimistic actions selected from the confidence set, and previously-played base actions from a baseline policy. In one example, the estimate for the reward is a minimum estimate over all parameter vectors in the confidence set. The estimate of the reward can be a safety value of a safety function of previously played actions and a current optimistic action.

It is determined whether the estimate of the reward is greater than a predetermined percentage of a function of the base expected rewards (block 412). In one example, a function of the base expected rewards comprises a sum of at least some of the base expected rewards, such as base expected rewards corresponding to previously-played rounds. The function of the base expected rewards is a measure of the performance of a baseline policy over previously-played rounds when no optimistic actions are played. Block 412 proceeds to FIG. 5.

Referring to FIG. 5, responsive to the determining at block 412 being the estimate of the reward is greater than the predetermined percentage of the function of the base expected rewards (e.g., the determination is TRUE), blocks, 414, 416, and 418 are entered.

The optimistic action is played (block 414). For instance, playing the optimistic action can comprise recommending an advertisement, recommending a movie, recommending a medical treatment, recommending a financial investment, recommending a product or service, providing a link to a web page, causing an image to be displayed on a client device, and the like.

A reward responsive to said playing the optimistic action is observed (block 416). For instance, a client may click on a link of a recommended product, buy a product, etc., or do nothing.

The confidence set is updated based on the optimistic action and the observed reward by removing at least some of the parameter vectors from the confidence set (block 418). The confidence set can be updated also based on previously-played actions. For instance, previously-played actions can comprise previously-played optimistic actions which result in observed rewards that can be used to estimate an unknown parameter vector, such as a least squares estimate of the unknown parameter vector. The estimate of the unknown parameter vector can be used to construct a distance measure for each parameter vector in the confidence set. In one example, the distance measure takes the square root of the sum of the squares of the differences between expected rewards of the parameter vectors and expected rewards of the estimate of the unknown parameter vector for previously-played optimistic actions. The distance measure for each parameter vector is compared to a constraint value, such as a value of a confidence function (e.g., a function of a desired confidence level), and based on the comparison, the parameter vector can be removed from the confidence set.

Responsive to the determining at block 412 being the estimate of the reward is not greater than the predetermined percentage of the function of the base expected rewards (e.g., the determination is FALSE), blocks, 420 and 422 are entered.

One of the plurality of base actions is played (block 420). Playing a base action with known expected reward instead of the optimistic action is conservative and safe when the optimistic action does not satisfy a safety constraint (e.g., its estimate of the reward is not greater than the predetermined percentage of the function of the base expected rewards).

The confidence set is maintained by retaining the parameter vectors in the confidence set (block 422). Because the base action has known expected reward, no new information is learned from playing it, so the confidence set is not updated, but rather is maintained.

Figure 6:
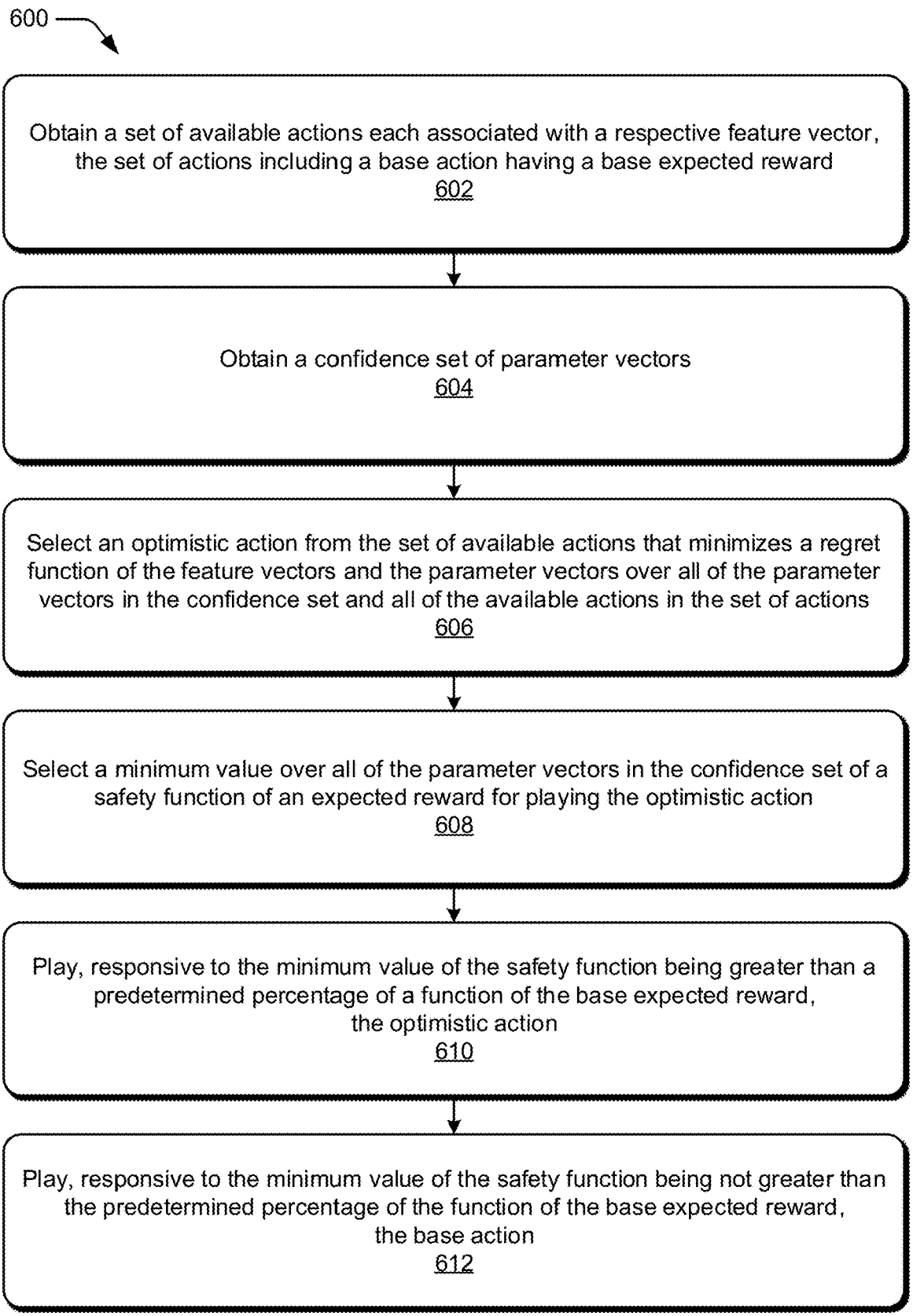
FIG. 6 is a flow diagram depicting an example procedure in accordance with one or more aspects of the disclosure.

FIG. 6 illustrates an example procedure 600 for recommending and playing actions in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of an action processing application 110, such as that described above. An action processing application implementing procedure 600 may be an independent application that has been installed on computing device 102, a service hosted by a service provider that is accessible by computing device 102, or a plug-in module to computing device 102. Furthermore, an action processing application implementing procedure 600 may be an application implemented at least partly on a client application of a client device, such as user device 116-1, 116-2, and 116-3.

A set of available actions each associated with a respective feature vector is obtained (block 602). The set of actions includes a base action having a base expected reward, e.g., corresponding to a baseline policy of an institution for recommending and playing actions. The set of available actions can be obtained in any suitable way, such as from a database of sets of available actions maintained by a retailer or service provider.

A confidence set of parameter vectors is obtained (block 604). The confidence set of parameter vectors can be obtained in any suitable way, such as from creating or storing a set of parameter vectors having bounded norms that comprise a parameter space, or a stored version of a confidence set being an updated confidence set that was previously updated responsive to a previously played action (e.g., a previously-played optimistic action such as a previously-recommended movie to a video-service subscriber).

An optimistic action from the set of available actions is selected that minimizes a regret function of the feature vectors and the parameter vectors over all of the parameter vectors in the confidence set and all of the available actions in the set of actions (block 606). For instance, the regret function can be a measure of loss for playing the optimistic action instead of playing a base action, such as based on a difference of an expected reward for playing the optimistic action and an expected reward for playing the base action.

A minimum value over all of the parameter vectors in the confidence set of a safety function of an expected reward for playing the optimistic action is selected (block 608). The safety function can also be a function of expected base rewards (e.g., known rewards for base actions of a baseline policy) for previous rounds where an optimistic action was not played, and of estimated rewards for previous rounds where an optimistic action was played.

Responsive to the minimum value of the safety function being greater than a predetermined percentage of a function of the base expected reward, the optimistic action is played (block 610). Furthermore, a reward responsive to playing the optimistic action can be observed, and the confidence set can be updated based on the optimistic action and the observed reward by removing at least some of the parameter vectors from the confidence set. The function of the base expected reward is a measure of the performance of a baseline policy over previously-played rounds when no optimistic actions are played, such as a sum of base expected rewards corresponding to previously-played rounds.

Responsive to the minimum value of the safety function being not greater than the predetermined percentage of the function of the base expected reward, the base action is played (block 612). Playing a base action with known expected reward instead of the optimistic action is conservative and safe when the minimum value of the safety function is not greater than the predetermined percentage of the function of the base expected reward.

The methods described herein constitute an improvement over current approaches for recommending or playing actions which primarily optimize a cost function (e.g., minimize a regret function) without constraining the performance of the learning algorithm for safety. The nature of the described embodiments to evaluate a safety function of the performance of optimistic actions for a worst-case value of the safety function, and compare the result to a predetermined percentage of the performance of a base policy in order to determine whether to recommend an optimistic action or a base action, results in a learning algorithm that does not recommend or play inappropriate actions even during early exploratory stages of learning. Furthermore, the learning algorithm consistently satisfies safety margins, and learns quickly as it can update a confidence set of parameter vectors each round an optimistic action is recommended or played.

Having considered example procedures in accordance with one or more implementations, consider now example simulated performance data in accordance with one or more aspects of the disclosure.

Figure 7:
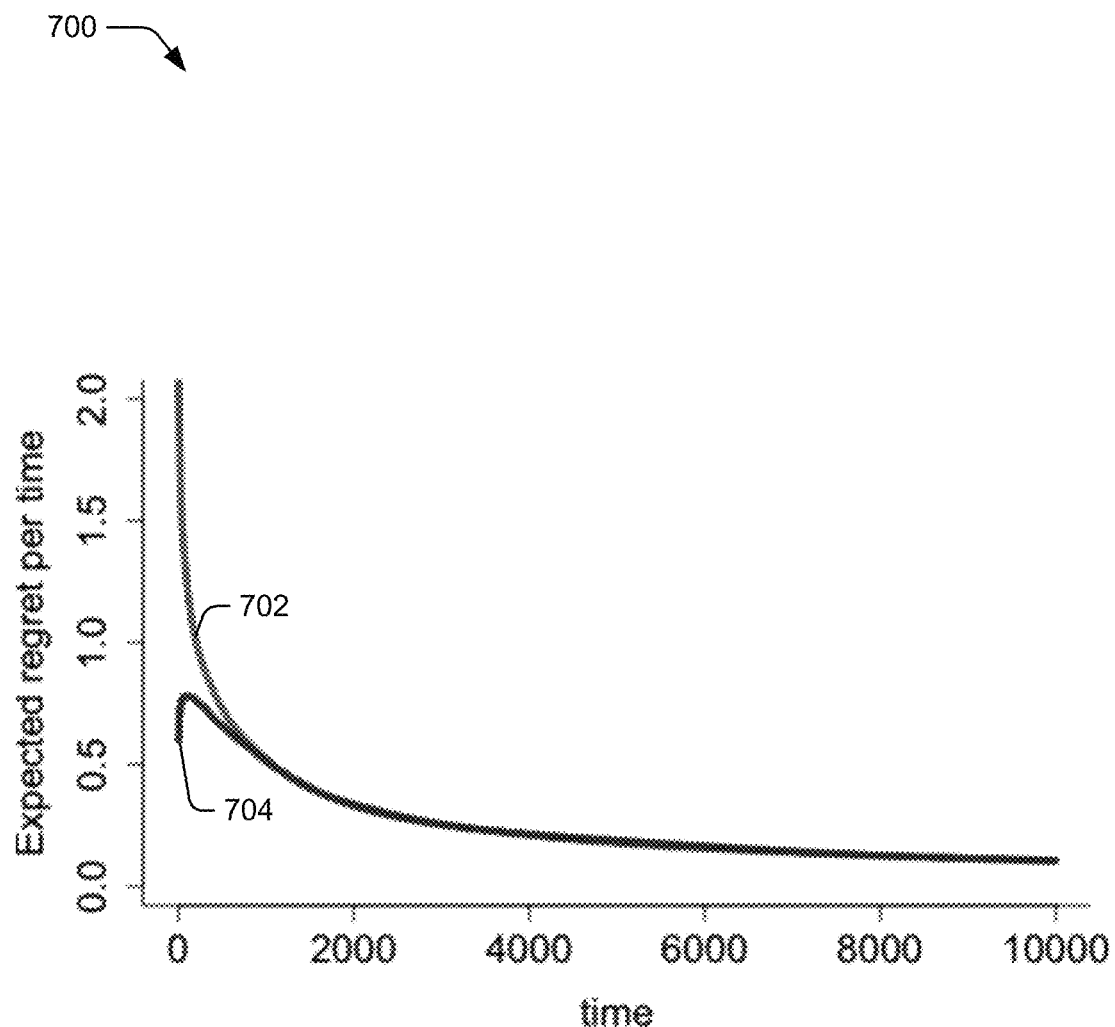
FIG. 7 is a graph depicting example simulated performance data in accordance with one or more aspects of the disclosure.

FIG. 7 illustrates example simulated performance data 700 for recommending and playing actions in accordance with one or more embodiments. In this simulation example, the set of available actions comprises 100 actions, each having a feature vector in $\mathbb{R}^{10}$ (e.g., d=10). The components of the feature vectors are drawn independent and identically distributed (i.i.d.) and uniformly in $$\left[\frac{-1}{\sqrt{10}}, \frac{1}{\sqrt{10}}\right].$$

The unknown parameter vector $\theta^* \in \mathbb{R}^{10}$ is drawn randomly from a multivariate normal distribution with mean $\theta \in \mathbb{R}^{10}$ and covariance matrix $10 \cdot I_{10}$ (where $I_{10}$ is the ten-by-ten identity matrix). The performance of the base action is selected to be the average of the performances of the second and third best actions. Fifty realizations of 10,000 rounds (samples) were generated, for which a bound of average regret was computed for the CLUCB algorithm summarized by the pseudo code in Table 1, and an alternative algorithm for which no safety constraint is used (e.g., the alternative algorithm plays a selected optimistic action for each round and never plays a base action).

Curve 702 corresponds to the regret of the alternative algorithm (using no safety constraint) and curve 704 corresponds to the regret of the CLUCB algorithm (using the safety constraint according to Table 1). Asymptotic performance of the two algorithms is similar. However, during the early exploratory stages of learning, since the alternative algorithm does not check a safety constraint, curve 702 exhibits a wild exploration stage in which regret is very high. On the other hand, curve 704 exhibits significantly less regret because the CLUCB algorithm evaluates a safety constraint at each round by comparing the value of a safety function to a percentage of the base expected reward, and plays an optimistic action only for rounds when the safety constraint is satisfied. Throughout the fifty realizations simulated, the CLUCB algorithm satisfied the constraint that $\Sigma_{i=1}^{t} r_{a_i}^{i} \geq (1-\alpha) \cdot \Sigma_{i=1}^{t} r_{b_i}^{i}$ with $\alpha=0.1$ 100% of the time, while the alternative algorithm violated the constraint an average of 333 times per realization.

Accordingly, performance of the CLUCB algorithm constitutes an improvement over performance of existing algorithms that do not guarantee performance by checking a safety constraint requiring the expected performance of optimistic actions to be at least as good as a percentage of the performance of base actions from a base policy.

Having considered example simulated performance data in accordance with one or more implementations, consider now an example system and device that can be utilized to practice the inventive principles described herein.

Example System and Device

Figure 8:
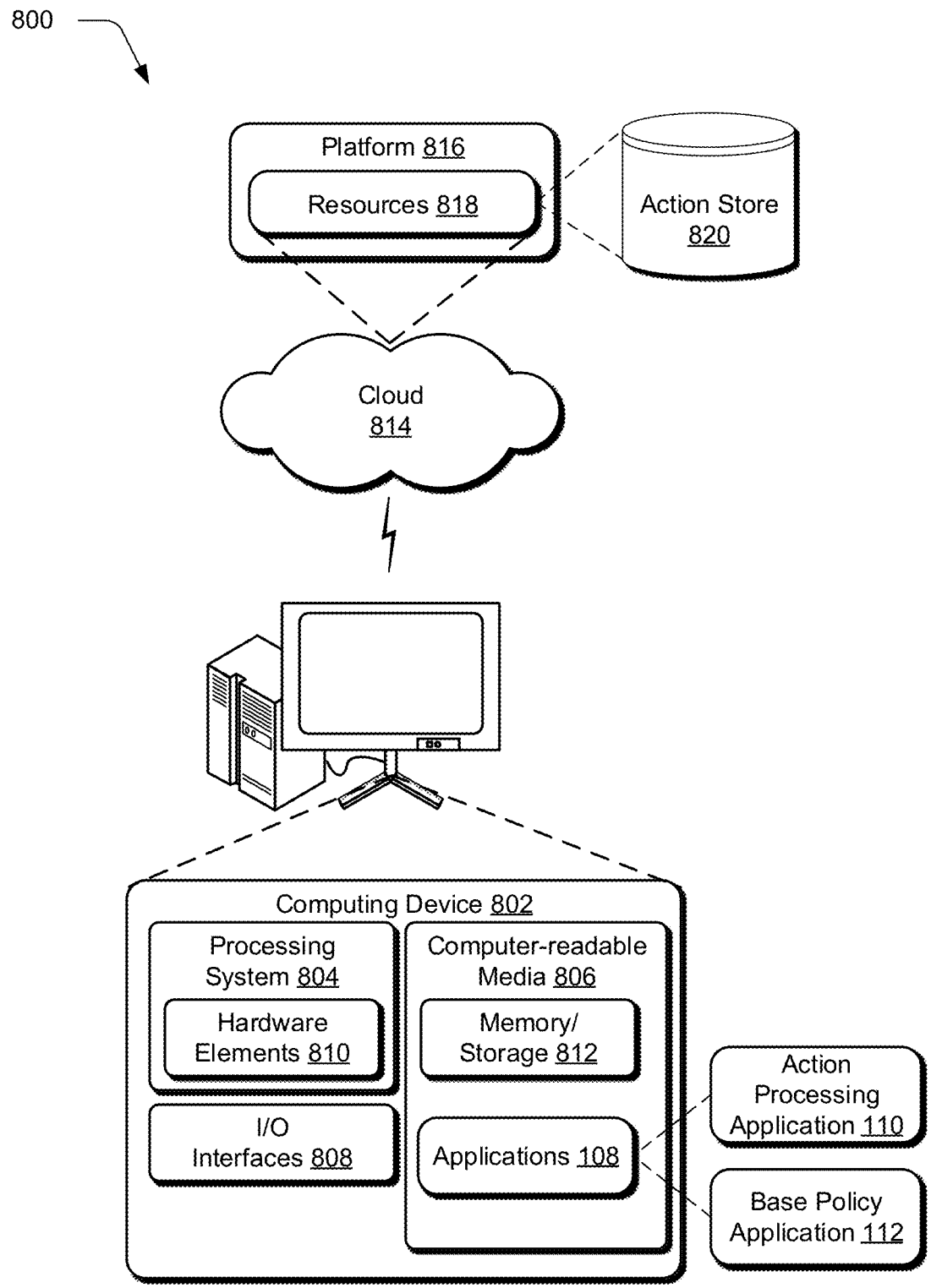
FIG. 8 illustrates an example system including various components of an example device that can be employed for one or more implementations described herein.

FIG. 8 illustrates an example system generally at 800 that includes an example computing device 802 that is representative of one or more computing systems and devices that may implement the various techniques described herein. This is illustrated through inclusion of the applications 108 and, in particular, action processing application 110 and base policy application 112, which operate as described above. The computing device 802 may be, for example, a server of a service provider, a device associated with a client (e.g., a client device), an on-chip system, or any other suitable computing device or computing system.

The example computing device 802 includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)), nonvolatile media (such as read only memory (ROM), Flash memory, optical disks, magnetic disks, and so forth), or combinations thereof. The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic, fixed device logic implemented in a hardware form, or combinations thereof that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 810, or combinations thereof. The computing device 802 may be configured to implement particular instructions and functions corresponding to the software and hardware modules. Accordingly, implementation of a module that is executable by the computing device 802 as software may be achieved at least partially in hardware, e.g., through use of computer-readable storage media and hardware elements 810 of the processing system 804. The instructions and functions may be executable/operable by one or more articles of manufacture (for example, one or more computing devices 802 or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and is representative of a platform 816 for resources 818. The platform 816 abstracts underlying functionality of hardware (e.g., servers) and software resources of the cloud 814. The resources 818 may include applications, data, or applications and data that can be utilized while computer processing is executed on servers that are remote from the computing device 802. Resources 818 can also include services provided over the Internet, through a subscriber network, such as a cellular or Wi-Fi network, or combinations thereof. Resources 818 can include action store 820, which stores sets of available actions and base actions corresponding to baseline policies, and may be accessed by computing device 802.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

In one or more implementations, a digital medium environment includes an action processing application that performs actions including personalized recommendation. A learning algorithm operates on a sample-by-sample basis (e.g., each instance a user visits a web page) and recommends an optimistic action, such as an action found by maximizing an expected reward, or a base action, such as an action from a baseline policy with known expected reward, subject to a safety constraint. The safety constraint requires that the expected performance of playing optimistic actions is at least as good as a predetermined percentage of the known performance of playing base actions. Thus, the learning algorithm is conservative during exploratory early stages of learning, and does not play unsafe actions, such as recommending an R-rated movie to a minor. Furthermore, since the learning algorithm is online and can learn with each sample, it converges quickly and is able to track time varying parameters better than learning algorithms that learn on a batch or block basis.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for recommending actions, a method implemented by at least one computing device, the method comprising:
    obtaining a set of available actions each described by a feature vector representing features of a respective action of the set of available actions, the set of available actions including a base action that is known to be safe to recommend because it does not include inappropriate user content, the base action having a base expected reward;
    obtaining a confidence set of parameter vectors indicating user preferences;
    selecting an optimistic action from the set of available actions that optimizes a cost function of the feature vectors and the parameter vectors by minimizing or maximizing the cost function over all of the parameter vectors in the confidence set and all of the available actions in the set of actions;
    evaluating a safety function for all of the parameter vectors in the confidence set to form a safety value to select and recommend the base action or the optimistic action, the safety function indicating an estimate of reward based on a measure of base reward for using the base action, a measure of previous reward for using previously-recommended optimistic actions, and a measure of optimistic reward for using the optimistic action;
    determining whether the safety value is greater than a predetermined percentage of a function of the base expected reward; and
    responsive to the determining being the safety value is greater than the predetermined percentage of the function of the base expected reward, recommending the optimistic action and updating the confidence set by removing at least one of the parameter vectors from the confidence set; or
    responsive to the determining being the safety value is not greater than the predetermined percentage of the function of the base expected reward, recommending the base action.

2. The method as described in claim 1, wherein the safety value is formed by evaluating the safety function for one of the parameter vectors in the confidence set that minimizes the safety function over all of the parameter vectors in the confidence set.

3. The method as described in claim 1, further comprising calculating a respective distance measure for each parameter vector in the confidence set and wherein the at least one parameter vector removed from the confidence set has the respective distance measure greater than a value of a confidence function of a desired confidence level and a cardinality of the previously-recommended optimistic actions.

4. The method as described in claim 1, wherein the confidence set is initialized to a vector space including all vectors of length less than or equal to a length of the parameter vectors having a norm less than a predetermined bound.

5. The method as described in claim 1, wherein the set of available actions varies over time.

6. The method as described in claim 1, wherein at least one of the feature vectors varies over time.

7. The method as described in claim 1, wherein the cost function comprises an inner product of one of the parameter vectors and one of the feature vectors.

8. The method as described in claim 1, wherein the obtaining the confidence set, the selecting, the evaluating, the determining, and the recommending the optimistic action or the recommending the base action are performed responsive to a user accessing a web page.

9. The method as described in claim 1, wherein the obtaining the confidence set includes obtaining an updated confidence set having been previously updated by removing parameter vectors from a previous confidence set.

10. The method as described in claim 1, wherein the base action is known to be safe to recommend according to a base policy already in use.

11. The method as described in claim 1, wherein the function of the base expected reward includes a product of the base expected reward and a number of previously-recommended actions including the previously-recommended optimistic actions and previously-recommended base actions.

12. The method as described in claim 1, wherein the updating the confidence set includes retaining an unknown optimum parameter vector in the confidence set corresponding to a user to whom the optimistic action or the base action is recommended.

13. A system implemented in a digital medium environment including a computing device having an action processing application to perform playing of actions, the system comprising:
a processing system; and
at least one computer readable medium storing instructions executable via the processing system to implement the action processing application configured to:
obtain a set of available actions each described by a feature vector that represents features of a respective action of the set of available actions;
obtain a base policy including base actions that are known to be safe to recommend because they do not include inappropriate user content, the base actions each having a respective base expected reward;
obtain a confidence set of parameter vectors indicating user preferences;
select an optimistic action from the set of available actions that maximizes an inner product of one of the parameter vectors and one of the feature vectors over all of the parameter vectors in the confidence set and all of the available actions in the set of available actions;
determine an estimate of a reward for all of the parameter vectors in the confidence set, the estimate of the reward based on a measure of previous reward for playing a number of previously-played actions including previously-played optimistic actions and previously-played base actions, and a measure of optimistic reward for playing the optimistic action;
determine whether a minimum estimate of the reward is greater than a predetermined percentage of a function of the base expected rewards; and
responsive to determining the minimum estimate of the reward is greater than the predetermined percentage of the function of the base expected rewards play the optimistic action and update the confidence set based on the optimistic action and an observed reward by removing at least one of the parameter vectors from the confidence set; or
responsive to determining the minimum estimate of the reward is not greater than the predetermined percentage of the function of the base expected rewards play one of the base actions and maintain the confidence set by retaining the parameter vectors in the confidence set.

14. The system as described in claim 13, wherein the action processing application is implemented to:
estimate an unknown optimum parameter vector of the parameter vectors based on the optimistic action and the observed reward, the unknown optimum parameter vector corresponding to a user for whom the optimistic action or one of the base actions is played;
determine a threshold distance by evaluating a confidence function of a desired confidence level and the number of previously-played actions; and
update the confidence set including retaining the parameter vectors in the confidence set that have expected rewards for the previously-played actions within the threshold distance of an expected reward of the unknown optimum parameter vector for the previously-played actions.

15. The system as described in claim 13, wherein the minimum estimate of the reward correlates to one of the user preferences in the confidence set that results in the lowest estimate over all parameter vectors in the confidence set.

16. The system as described in claim 13, wherein the action processing application is implemented to determine the function of the base expected rewards as a sum of the base expected rewards corresponding to previous rounds of recommendations.

17. In a digital medium environment for playing actions, a method implemented by at least one computing device, the method comprising:
a step for obtaining a set of available actions each described by a feature vector representing features of a respective action of the set of available actions, the set of available actions including a base action that is known to be safe to recommend because it does not include inappropriate user content, the base action having a base expected reward;
a step for obtaining a confidence set of parameter vectors indicating user preferences;
a step for selecting an optimistic action from the set of available actions that minimizes a regret function of the feature vectors and the parameter vectors over all of the parameter vectors in the confidence set and all of the available actions in the set of actions;
a step for evaluating a safety function for all of the parameter vectors in the confidence set, the safety function corresponding to an expected reward for playing the base action, playing the optimistic action, and playing previously-recommended optimistic actions;
a step for selecting a minimum value of the safety function evaluated for one of the parameter vectors in the confidence set that minimizes the base expected reward; and
a step for playing, responsive to the minimum value of the safety function being greater than a predetermined percentage of a function of the base expected reward, the optimistic action; or
a step for playing, responsive to the minimum value of the safety function being not greater than the predetermined percentage of the function of the base expected reward, the base action.

18. The method as described in claim 17, further comprising:
receiving an indication of a reward responsive to the playing the optimistic action; and
a step for updating the confidence set based on the optimistic action and the observed reward by removing at least one of the parameter vectors from the confidence set.

19. The method as described in claim 17, wherein the steps are performed online responsive to a user accessing a web page.

20. The method as described in claim 17, wherein the playing the optimistic action includes at least one of:
   recommending an advertisement;
   recommending a movie;
   recommending a medical treatment; and
   recommending a financial investment.

* * * * *